United States Patent
Yamamoto et al.

(10) Patent No.: US 6,416,140 B1
(45) Date of Patent: Jul. 9, 2002

(54) VEHICLE BRAKE CONTROL APPARATUS FOR CONTROLLING NORMAL WHEEL BRAKES UPON DETECTION OF DEFECTIVE WHEEL BRAKE OR BRAKES

(75) Inventors: Takayuki Yamamoto, Aichi-gun; Seiichi Kojima, Niwa-gun; Hiroaki Aizawa, Kariya; Naoki Sawada, Anjo, all of (JP)

(73) Assignees: Toyota Jidosha Kabushiki Kaisha, Toyota; Denso Corporation; Aisin Seiki Kabushiki Kaisha, both of Kariya, all of (JP)

( * ) Notice: Subject to any disclaimer, the term of this patent is extended or adjusted under 35 U.S.C. 154(b) by 0 days.

(21) Appl. No.: 09/667,015

(22) Filed: Sep. 20, 2000

(30) Foreign Application Priority Data

Sep. 21, 1999 (JP) .............................. 11-266614
Nov. 29, 1999 (JP) .............................. 11-337750

(51) Int. Cl.⁷ ................................................ B60T 8/88
(52) U.S. Cl. ....................................... 303/122; 303/146
(58) Field of Search ................................ 303/146, 191, 303/147, 148, 122–122.15

(56) References Cited

U.S. PATENT DOCUMENTS

| | | | | | |
|---|---|---|---|---|---|
| 5,134,352 A | * | 7/1992 | Matsumoto et al. | ......... | 318/587 |
| 5,520,448 A | * | 5/1996 | Okubo | ......... | 303/148 |
| 5,576,959 A | * | 11/1996 | Hrovat | ......... | 364/426.03 |
| 5,704,695 A | * | 1/1998 | Monzaki | ......... | 303/146 |
| 5,711,025 A | * | 1/1998 | Eckert et al. | ......... | 701/83 |
| 5,762,406 A | * | 6/1998 | Yasui et al. | ......... | 303/146 |
| 6,132,014 A | * | 10/2000 | Kiso et al. | ......... | 303/146 |
| 6,158,826 A | * | 12/2000 | Yasuda | ......... | 303/191 |
| 6,273,529 B1 | * | 8/2001 | Woywod et al. | ......... | 303/173 |
| 6,290,311 B1 | * | 9/2001 | Watanabe et al. | ......... | 303/146 |
| 6,292,735 B1 | * | 9/2001 | Kimbrough | ......... | 701/91 |

FOREIGN PATENT DOCUMENTS

JP    2835173    10/1998

* cited by examiner

*Primary Examiner*—Paul N. Dickson
*Assistant Examiner*—Benjamin A Pezzlo
(74) *Attorney, Agent, or Firm*—Kenyon & Kenyon

(57) ABSTRACT

A brake control apparatus for controlling at least three brake devices provided for braking respective at least three wheels of an automotive vehicle which includes two wheels located on respective left and right sides of the vehicle, wherein an emergency brake control portion is provided for controlling at least two normal brake devices when at least one of the at least three brake devices is defective, such that a difference between a total left-side braking force to be generated by at least one normal brake device located on the left side of the vehicle and a total right-side braking force to be generated by the other normal brake device or devices located on the right side is made larger when operations of all of the normal brake devices in a detected running condition of the vehicle are not likely to deteriorate the vehicle running stability, than when the operations of all of the normal brake devices in the detected running condition are likely to deteriorate the vehicle running stability.

21 Claims, 11 Drawing Sheets

| DEFECTIVE STATE | | VEHICLE RUNNING STATE | | BRAKE CONTROL MODES | |
|---|---|---|---|---|---|
| DEFECTIVE BRAKE(S) | VEHICLE DECELERATION | | | | |
| ONE DEFECTIVE BRAKE | | 0.85G | STABLE | ○ | PERMITTING OPERATIONS OF THREE NORMAL BRAKES | |
| | | 0.85G | STABLE | ○ | PERMITTING OPERATIONS OF THREE NORMAL BRAKES | |
| | | 0.65G (0.5G) | VEHICLE SPINNING TENDENCY | × | PERMITTING OR INHIBITING OPERATION OF RR BRAKE 16 DEPENDING UPON V AND δ | |
| | | 0.65G (0.5G) | VEHICLE SPINNING TENDENCY | × | PERMITTING OR INHIBITING OPERATION OF RL BRAKE 14 DEPENDING UPON V AND δ | |
| TWO DEFECTIVE BRAKE | | 0.7G | STABLE | ○ | PERMITTING OPERATIONS OF TWO NORMAL BRAKES | |
| | | 0.3G | STABLE | ○ | PERMITTING OPERATIONS OF TWO NORMAL BRAKES | |
| | | 0.5G | STABLE | ○ | PERMITTING OPERATIONS OF TWO NORMAL BRAKES | |
| | | 0.5G | STABLE | ○ | PERMITTING OPERATIONS OF TWO NORMAL BRAKES | |
| | | 0.5G (0.35G) | VEHICLE SPINNING TENDENCY | × | PERMITTING OR INHIBITING OPERATION OF RR BRAKE 16 DEPENDING UPON V AND δ | |
| | | 0.5G (0.35G) | VEHICLE SPINNING TENDENCY | × | PERMITTING OR INHIBITING OPERATION OF RL BRAKE 14 DEPENDING UPON V AND δ | |

FIG. 2

| DEFECTIVE STATE | | VEHICLE RUNNING STATE | | BRAKE CONTROL MODES |
|---|---|---|---|---|
| DEFECTIVE BRAKE(S) | VEHICLE DECELERATION | | | |
| ONE DEFECTIVE BRAKE | 0.85G | STABLE | ○ | PERMITTING OPERATIONS OF THREE NORMAL BRAKES |
| | 0.85G | STABLE | ○ | PERMITTING OPERATIONS OF THREE NORMAL BRAKES |
| | 0.65G (0.5G) | VEHICLE SPINNING TENDENCY | × | PERMITTING OR INHIBITING OPERATION OF RR BRAKE 16 DEPENDING UPON V AND δ |
| | 0.65G (0.5G) | VEHICLE SPINNING TENDENCY | × | PERMITTING OR INHIBITING OPERATION OF RL BRAKE 14 DEPENDING UPON V AND δ |
| TWO DEFECTIVE BRAKE | 0.7G | STABLE | ○ | PERMITTING OPERATIONS OF TWO NORMAL BRAKES |
| | 0.3G | STABLE | ○ | PERMITTING OPERATIONS OF TWO NORMAL BRAKES |
| | 0.5G | STABLE | ○ | PERMITTING OPERATIONS OF TWO NORMAL BRAKES |
| | 0.5G | STABLE | ○ | PERMITTING OPERATIONS OF TWO NORMAL BRAKES |
| | 0.5G (0.35G) | VEHICLE SPINNING TENDENCY | × | PERMITTING OR INHIBITING OPERATION OF RR BRAKE 16 DEPENDING UPON V AND δ |
| | 0.5G (0.35G) | VEHICLE SPINNING TENDENCY | × | PERMITTING OR INHIBITING OPERATION OF RL BRAKE 14 DEPENDING UPON V AND δ |

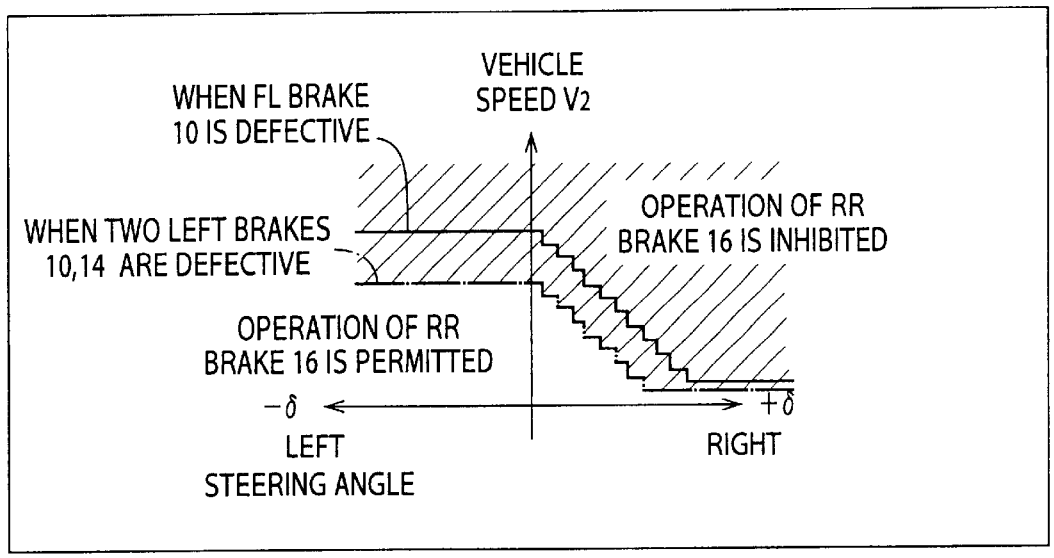
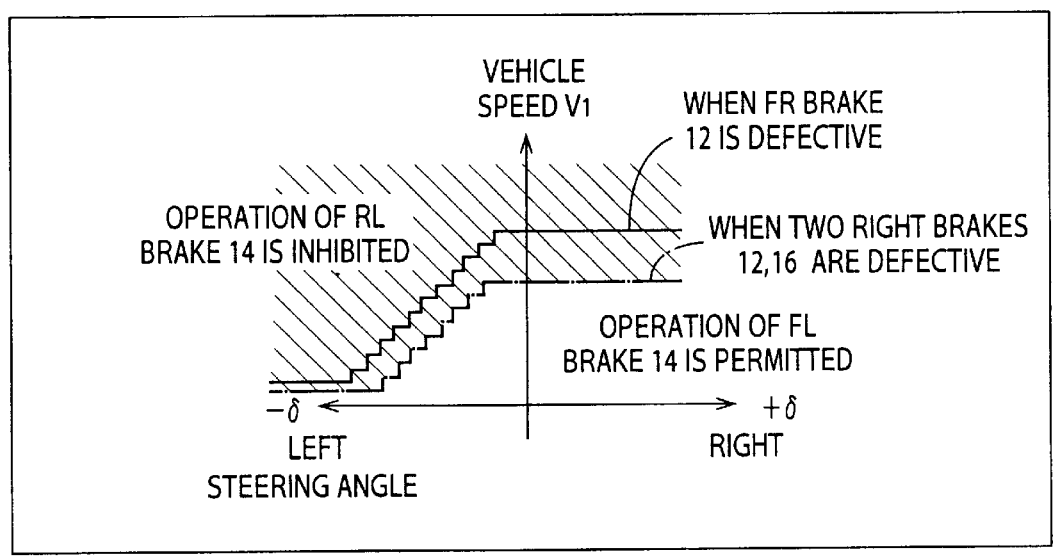

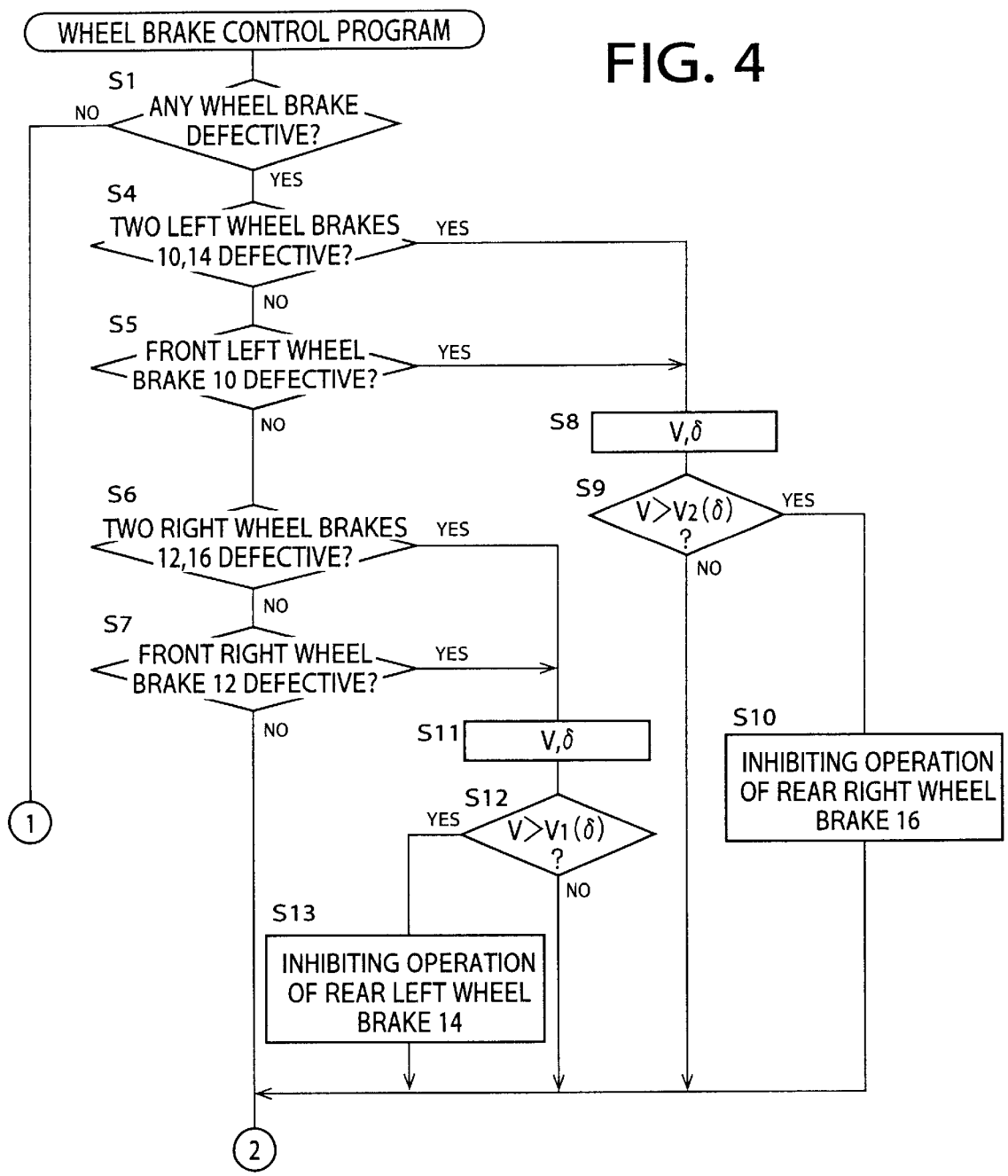

FIG. 8

| STATES OF SERVICE BRAKES | | | SERVICE BRAKES | | | PARKING BRAKES | | | |
|---|---|---|---|---|---|---|---|---|---|
| FR | FL | RR | RL | FR | FL | RR | RL | FR | FL | RR | RL |
| ○ | ○ | ○ | × | ○ | ○ | ○ | — | — | — | — | — |
| ○ | ○ | × | ○ | ○ | ○ | — | ○ | — | — | — | — |
| ○ | × | ○ | ○ | — | — | ○ | ○ | — | ○ | — | — |
| × | ○ | ○ | ○ | ○ | ○ | ○ | -△ | — | — | — | — |
| ○ | ○ | × | × | ○ | ○ | — | — | — | — | ○ | ○ |
| ○ | × | ○ | × | ○ | — | -△ | — | — | ○ | — | ○ |
| ○ | × | × | ○ | ○ | — | — | ○ | — | ○ | ○ | — |
| × | ○ | ○ | × | — | ○ | ○ | — | ○ | — | — | — |
| × | ○ | × | ○ | — | ○ | — | ○ | ○ | ○ | ○ | — |
| × | × | ○ | ○ | — | — | ○ | ○ | ○ | ○ | — | — |
| ○ | × | × | × | ○ | — | — | — | — | — | ○ | ○ |
| × | ○ | × | × | — | ○ | — | — | ○ | — | ○ | ○ |
| × | × | ○ | × | — | — | ○ | — | ○ | ○ | — | ○ |
| × | × | × | ○ | — | — | — | — | ○ | ○ | ○ | — |
| × | × | × | × | — | — | — | — | ○ | ○ | ○ | ○ |

○ : OPERATION PERMITTED
△ : OPERATION RESTRICTED

FIG. 10

| STATES OF SERVICE BRAKES | | | | SERVICE BRAKES | | | | PARKING BRAKES | | | |
|---|---|---|---|---|---|---|---|---|---|---|---|
| FR | FL | RR | RL | FR | FL | RR | RL | FR | FL | RR | RL |
| O | O | O | X | O | O | △ | — | — | — | — | O |
| O | O | X | O | O | O | — | △ | — | — | O | — |
| O | X | O | O | O | — | O | △ | — | O | — | — |
| X | O | O | O | — | O | △ | △ | O | — | — | — |
| O | O | X | X | O | O | △ | — | — | O | O | O |
| O | X | O | X | — | — | — | △ | O | O | — | O |
| O | X | X | O | — | — | O | O | O | O | O | — |
| X | O | O | X | — | — | △ | △ | — | — | O | — |
| X | O | X | O | — | O | — | — | O | — | O | O |
| X | X | O | O | — | O | — | — | O | O | — | O |
| O | X | X | X | — | △ | △ | — | — | O | O | O |
| X | O | X | X | △ | — | — | — | O | — | O | O |
| X | X | O | X | — | — | △ | — | O | O | — | O |
| X | X | X | O | — | — | — | △ | O | O | O | — |

O : OPERATION PERMITTED
△ : OPERATION RESTRICTED

VEHICLE BRAKE CONTROL APPARATUS FOR CONTROLLING NORMAL WHEEL BRAKES UPON DETECTION OF DEFECTIVE WHEEL BRAKE OR BRAKES This application is based on Japanese Patent Application Nos. 11-266614 filed Sep. 21, 1999 and 11-337750 filed Nov. 29, 1999, the contents of which are incorporated hereinto by reference.

BACKGROUND OF THE INVENTION

1. Field of the Invention

The present invention relates to a brake control apparatus for controlling braking forces to be generated by a plurality of brake devices for braking respective wheels of a vehicle.

2. Discussion of Related Art

An example of such a brake control apparatus is disclosed in JP-B2-2835173. This brake control apparatus is adapted to control braking forces to be generated by respective brake devices in the form of four wheel brakes for braking four wheels of an automotive vehicle, namely, a front left wheel, a front right wheel, a rear left wheel and a rear right wheel of the vehicle. The brake control apparatus includes a brake-operation inhibiting portion operable when at least one of the wheel brakes is defective, for inhibiting an operation of one of the normal wheel brakes which is determined by the location of the at least one wheel corresponding to the defective at least one wheel brake.

Where the wheel brake for the rear right wheel is defective, for instance, the brake-operating inhibiting portion of the brake control apparatus indicated above inhibits an operation of the normal wheel brake for the rear left wheel. Where the wheel brakes for the front left and right wheels are defective, the brake-operation inhibiting portion inhibits an operation of the normal wheel brake for the rear right wheel. This control arrangement reduces a difference between the total braking force generated by the two wheel brakes on the left side of the vehicle and the total braking force generated by the two other wheel brakes on the right side, so that the running stability of the vehicle is improved.

The present inventors have found that the known brake control apparatus indicated above has a further room for improvement for more effectively utilizing the normal wheel brake or brakes while restraining a reduction in the running stability of the vehicle when at least one of the wheel brakes is defective. That is, the inventors have found that there are some cases where a reduction in the running stability of the vehicle due to a difference between the total braking force of the left wheel brakes and that of the right wheel brakes is not so large as to cause a problem.

SUMMARY OF THE INVENTION

It is therefore an object of the present invention to provide a brake control apparatus which permits effective utilization of the normal brake devices while assuring a substantially acceptable degree of running stability of the vehicle.

The above object may be achieved may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A brake control apparatus for controlling at least three brake devices provided for braking respective at least three wheels of an automotive vehicle which includes two wheels located on respective left and right sides of the vehicle, the brake control apparatus comprising an emergency brake control portion for controlling at least two normal brake devices of the at least three brake devices when at least one of the at least three brake devices is defective, such that a difference between a total left-side braking force to be generated by at least one of the at least two normal brake devices which is located on the left side of the vehicle and a total right-side braking force to be generated by the other of the at least two normal brake devices which is located on the right side of the vehicle is made larger when operations of all of the at least two normal brake devices in a detected running condition of the vehicle are not likely to deteriorate a running stability of the vehicle, than when the operations of all of the at least two normal brake devices in the detected running condition are likely to deteriorate the running stability of the vehicle.

In the brake control apparatus constructed according to the above mode (1) of this invention, the emergency brake control portion is operable when at least one of the at least three brake devices, for controlling at least two normal brake devices of the at lest three brake devices, such that a difference between the total left-side braking force to be generated by at least one of the at least two normal brake devices which is located on the left side of the vehicle and the total right-side braking force to be generated by the other of the at least two normal brake devices which is located on the right side of the vehicle is made larger when operations of all of the at least two normal brake devices in the detected vehicle running condition are not likely to deteriorate the vehicle running stability, than when the operations of all of the at least two normal brake devices in the detected vehicle running condition are likely to deteriorate the vehicle running stability.

In the known brake control apparatus, when the brake device for the rear right wheel is defective, the operation of the normal brake device for the rear left wheel is necessarily inhibited. To the contrary, the present brake control apparatus may be adapted to permit the operation of the normal brake device for the rear left wheel when the operation of this normal brake device for the rear left wheel in the presently detected vehicle running condition is not likely to deteriorate the vehicle running stability. Thus, the present brake control apparatus permits effective utilization of the normal brake device for the rear left wheel, thereby reducing the reduction of the total braking force of the vehicle when at least one of the brake devices is defective.

(2) A brake control apparatus according to the above mode (1), wherein the emergency brake control portion includes a running-condition detecting portion for effecting a determination as whether the operations of all of the at least two normal brake devices in the detected running condition of the vehicle are likely to deteriorate the running stability of the vehicle or not, on the basis of at least one of a detected running speed and a detected steering state of the vehicle.

Where the defective brake device is provided for the wheel which is located on the inner side of the path of turning of the vehicle, for instance, the operations of all the normal brake devices in the detected vehicle running condition including. the detected vehicle steering state (steering angle and direction) are less likely to deteriorate the vehicle running stability than when the defective brake device is provided for the wheel located on the outer side of the path of turning of the vehicle. When the vehicle is turning with the defective brake device located on the inner side of the vehicle turning path, a moment acts on the vehicle in the turning direction, while a moment due to a difference between the total inner-side braking force and the total outer-side braking force acts on the vehicle in the direction opposite to the turning direction of the vehicle, since the total outer-side braking force is larger than the total inner-side braking force on the inner side. Accordingly, the vehicle has a comparatively low spinning tendency owing to an effect of offsetting of the moment due to the turning of the vehicle and the moment due to the braking force difference on the inner and outer sides of the vehicle turning path when the defective brake device is located on the inner side of the vehicle turning path. Where the defective brake device is located on the outer side of the vehicle turning path, on the other hand, the moment due to the vehicle turning and the moment due to the braking force difference act on the vehicle in the same direction, namely, in the vehicle turning direction, so that the vehicle has a comparatively high spinning tendency. Thus, the vehicle has a higher degree of vehicle running stability where the defective brake device is located on the inner side of the vehicle turning path.

Where the defective brake device is located on the outer side of the vehicle turning path, the vehicle running stability is considered to be higher when the steering angle of the vehicle (steering angle of the front wheels) is relatively small than when the steering angle is relatively large. For example, the vehicle is considered to have a comparatively high degree of running stability when the detected steering angle is smaller than a predetermined threshold. The determination as to whether the operations of all of the normal brake devices are like to deteriorate the vehicle running stability may be effected on the basis of the steering angle of the steering wheel, vehicle yaw rate or other parameters, other than the steering angle of the front wheels.

Further, the vehicle running stability is considered to be higher when the vehicle running speed is relatively low than when the vehicle running speed is relatively high. For instance, the vehicle is considered to have a comparatively high degree of running stability when the detected vehicle running speed is lower than a predetermined threshold. When the vehicle running speed is relatively low, the lateral force expected to act on the vehicle at a given steering angle of the vehicle is smaller than when the vehicle running speed is relatively high. Accordingly, the moment due to the braking force difference on the left and right sides of the vehicle will not have a considerable influence on the running behavior of the vehicle. Even if this moment more or less deteriorate the vehicle running stability, the deteriorated running stability may be comparatively easily rectified by the vehicle operator by manipulating the steering wheel.

It is also noted that the determination as to whether the operations of all of the normal brake devices are likely to deteriorate the vehicle running stability or not may be accomplished with a higher degree of accuracy, on the basis of both of the steering state and the running speed of the vehicle.

(3) A brake control apparatus according to the above mode (2), wherein the running-condition detecting portion determines that the operations of all of the at least two normal brake devices in the detected running condition of the vehicle are not likely to deteriorate the running stability of the vehicle, when the detected running speed is lower than a predetermined threshold determined by the detected steering state of the vehicle.

In the brake control apparatus according to the above mode (3), the threshold of the vehicle running speed may be determined to be lower when the detected steering angle of the vehicle is relatively large than when the detected steering angle is relatively small. It is reasonable to determine that the vehicle has a relatively high degree of running stability when the steering angle is relatively small even where the vehicle running speed is relatively high, or when the vehicle running speed is relatively low even where the steering angle is relatively large.

(4) A brake control apparatus according to any one of the above modes (1)–(3), wherein the emergency brake control portion includes a turning-direction-based running-condition detecting portion for detecting a determination as to whether the operations of all of the at least two normal brake devices in the detected running condition of the vehicle are likely to deteriorate the running stability of the vehicle, on the basis of a location of each of said at least one defective brake device on the vehicle and a detected direction of turning of the vehicle.

(5) A brake control apparatus according to the above mode (4), wherein the turning-direction-based running-condition detecting portion determines that the operations of all of the at least two normal brake devices in the detected running condition are not likely to deteriorate the running stability of the vehicle when said at least one defective broke device includes a brake device provided for one of the at least three wheels which is located on an inner side of a path of turning of the vehicle in the detected direction.

(6) A brake control apparatus according to any one of the above modes (1)–(5), wherein the emergency brake control portion determines that the vehicle has a higher degree of running stability when the number of said at least one defective brake device is relatively small than when the above-indicated number is relatively large.

The difference between the total left-side braking force to be generated by all of the at least one normal brake device located on the left side of the vehicle and the total right-side braking force to be generated by all of the at least one normal brake device located on the right side of the vehicle is larger where the at least one defective brake device consists of two brake devices located on one of the left and right sides of the vehicle, than where only one brake device on one side of the vehicle is defective. Where the two brake devices on one side of the vehicle are defective, the operations of the normal brake devices located on the other side of the vehicle may cause a considerably large braking force difference on the left and right sides of the vehicle, leading to a risk of deterioration of the driving stability of the vehicle. Thus, it is reasonable to determine that the vehicle has a lower degree of running stability when two brake devices are defective than when only one brake device is defective. In other words, it is reasonable to determine that the vehicle has a higher degree of running stability and the normal brake devices can be more effectively utilized, when only one brake device is defective.

(7) A brake control apparatus according to any one of the above modes (1)–(6), wherein the emergency brake control portion controls a braking force to be generated by each of at least one of the at least two normal brake devices, on the basis of the detected running condition of the vehicle.

In the brake control apparatus according to the above mode (7) wherein the braking force to be generated by at least one of the at least two normal brake devices is controlled on the basis of the detected vehicle running condition, it is possible to reduce the amount of reduction of the total vehicle braking force due to the defect of the at least one brake device, while maintaining the vehicle running stability at a substantially acceptable level.

For instance, the braking force of the normal brake device may be controlled to a value corresponding to the detected degree of vehicle running stability. The braking force to be generated may be controlled such that it is increased with an increase in the vehicle running stability. The controlled braking force may be increased either continuously or in steps as the detected vehicle running stability increases. The controlled braking force may be zeroed as needed. Namely, the operation of at least one of the normal brake devices may be inhibited. The at least one normal brake whose braking force is controlled preferably includes at least one brake device which is located on one side of the vehicle which is opposite to the side on which at least one of the at least one defective brake device is located.

For example, the braking force of the normal brake device may be controlled on the basis of the detected running speed of the vehicle. The vehicle running stability is considered to be reduced with an increase in the vehicle running speed, so that the braking force to be generated by the normal brake device is reduced with an increase in the vehicle running speed. Where the braking force to be generated the normal brake device is controlled to a value larger than zero but smaller than the normally desired value, the total vehicle braking force can be made larger than where the operation of the normal brake device is inhibited, and the vehicle running, stability can be higher than where the braking force is controlled to the normally desired value.

Alternatively, the braking force of the normal brake device may be controlled on the basis of the detected steering state of the vehicle. For instance the braking force may be reduced with an increase in the steering angle of the front wheels, since the vehicle running stability is reduced with an increase in the steering angle of the vehicle.

(8) A brake control apparatus according to any one of the above modes (1–(7), wherein the emergency brake control portion includes a change-rate restricting portion for controlling at least one of a rate of increase and a rate of reduction of a braking force to be generated by each of at least one of the at least two normal brake devices, such that each of the at least one of the rates of increase and reduction is lower when at least one of the at least three brake devices is found defective than when none of the at least three brake devices is found detective.

In the brake control apparatus according to the above mode (8) wherein the rate of change of the braking force to be generated by the normal brake device is made lower when at least one of the at least three brake devices is detective, the rate of change of the braking force difference on the left and right sides of the vehicle can be reduced. That is, the rate of change of the braking force to be generated by the normal brake device is restricted so as to prevent an excessively high rate of change of the braking force difference, so that the rate of change of the moment acting on the vehicle due to the braking force difference is restricted. Accordingly, the vehicle running stability which is more or less deteriorated due to a change in the moment acting on the vehicle can be rectified by the vehicle operator by manipulating the steering wheel.

The above-indicated restriction of at least one of the rates of increase and reduction of the braking force may be effected for all of the at least two normal brake devices, or for at least one of the normal brake device which is located on one side of the vehicle that is opposite to the side on which at least one of the at least one defective brake device is located.

The rate of increase and/or the rate of reduction of the braking force may be restricted to a predetermined constant value or a value which varies with the detected running condition of the vehicle.

(9) A brake control apparatus according to any one of the above modes (1)–(7), wherein the emergency brake control portion includes a change-rate restricting portion for controlling at least one of a rate of increase and a rate of reduction of a braking force to be generated by each of at least one of the at least two normal brake devices, such that each of the at least one of the rates of increase and reduction is lower when normal operations of all of the at least two normal brake devices in the detecting running condition of the vehicle are likely to increase the difference between the total left-side braking force and the total right-side braking force, than when the normal operations are not like to increase the difference.

Where the normal operations of all of the normal brake devices are likely to increase the braking force difference on the left and right sides of the vehicle, it is preferable to restrict the rate of change of the braking force to be generated by at least one of the normal brake devices. When the normal operations of the normal brake devices are not likely to considerably increase the braking force difference, it is not necessary to restrict the rate of change of the braking force to be generated by the normal brake device or devices.

(10) A brake control apparatus for controlling a plurality of brake devices for braking respective wheels of an automotive vehicle, wherein a change-rate restricting portion is provided for restricting at least one of a rate of increase and rate of reduction of a barking force to be generated by each of at least one of at least one normal brake device of the plurality of brake devices, when at least one of the plurality of brake devices is found defective, such that each of the at least one of the rates of increase and reduction is lower when the at least one of the at least three brake devices is found defective than when none of the plurality of brake devices is found defective.

(11) A brake control apparatus according to any one of the above modes (1)–(10, wherein each of the brake devices includes a friction member movably supported by a body of the automotive vehicle, and an electrically operated actuator operable to force the friction member against a rotor rotating with a corresponding one of the wheels, the electrically operated actuator being operated with an electric energy to be supplied thereto such that a force by which the friction member is forced against the rotor by the actuator is controllable by controlling an amount of the electric energy.

Each of the brake devices may be an electrically operated brake device including an electrically operated actuator in the form of an electric motor, for instance. In this type of electrically operated brake device, the friction member is moved by the electric motor other electrically operated actuator, into pressing contact with the rotor rotating with the corresponding wheel, so that the wheel is braked. The pressing force by which the friction member is forced against the rotor is controllable by controlling the amount of the electric energy to be supplied to the electrically operated actuator.

Alternatively, each of the brake device may be a hydraulically operated brake device including a wheel brake cylinder, and a hydraulic pressure control device capable of regulating the pressure of a fluid in the wheel brake cylinder.

The hydraulic pressure control device includes at least one solenoid-operated control valve disposed in a hydraulic circuit connected to the wheel brake cylinder, a high-pressure source and a low-pressure source. By controlling the at least one control valve, the fluid pressure in the wheel brake cylinder can be increased and reduced, for thereby controlling the force by which the friction member is forced against the rotor. In this case, the wheel brake cylinder and the hydraulic pressure control device constitute an electrically controlled actuator. In a further alternative arrangement, the electrically controlled actuator includes a wheel brake cylinder, a pump connected to the wheel brake cylinder, an electrically operated pump motor for driving the pump. The pressure of the pressurized working fluid delivered from the pump is controlled by controlling the pump motor, so that the fluid pressure in the wheel brake cylinder is accordingly controlled. In this type of electrically controlled actuator, the pump motor, wheel brake cylinder and working fluid may be considered as a drive source, an output member, and a power transmitting medium, respectively.

In the brake device of any one of the types indicated above, the braking force to be generated by the brake device is controllable by controlling the amount of electric energy supplied to the electrically operated and controlled actuator. The braking force may be controlled to a value corresponding to an amount of operation of a brake pedal or other brake operating member, or to a value not corresponding to the amount of operation of the brake operating member. Since the brake device generates a braking force by application of an electric energy to the electrically controlled actuator, the brake device fails to generate a braking force even with the electrically controlled actuator being supplied with the electric energy, when the actuator is defective. The brake device may be arranged to mechanically generate a braking device based on the operating force acting on the brake operating member. In this case, however, the brake device is required to generate not only the mechanically generated braking force, but also a braking force which varies with a change in the controlled amount of electric energy to be supplied to the defective actuator.

The brake device is not limited to the friction type indicated above, but may be a regenerative brake device which utilizes a wheel drive electric motor operable to generate a regenerative braking effect for braking the corresponding wheel. In this case, the electric motor is provided for each of the wheels, for driving the corresponding wheel, and is controllable to control the regenerative braking torque to be applied to the corresponding wheel.

(12) A brake control apparatus for controlling a plurality of brake devices for braking respective wheels of an automotive vehicle, wherein an emergency brake control portion is provided for controlling at least one normal brake device of the plurality of brake devices when at least one of the plurality of brake device is defective, such that a braking force to be generated by each of at least one of the at least one normal brake device is controlled on the basis of a detected running speed of the vehicle.

In the brake control apparatus according to the above mode (12), the braking force to be generated by each of at least one of the at least one normal brake device is controlled by the emergency brake control portion, on the basis of the detected vehicle running speed.

The brake control apparatus according to the above mode may include the technical feature according to any one of the above modes (1)–(11).

(13) A brake control apparatus according to the above mode (12), wherein the emergency brake control portion operates all of the at least one normal brake device when the detected running speed of the vehicle is lower than a predetermined threshold, and inhibits an operation of at least one of the at least one normal brake device when the detected running speed is not lower than the predetermined threshold.

When the vehicle running speed is lower than the predetermined threshold, the vehicle running stability can be maintained at a substantially acceptable level even if all of the at least one normal brake device are operated. In this condition, the at least one normal brake device can be effectively utilized when at least one of the brake devices is defective. When the vehicle running speed is not lower than the threshold, it is desirable to inhibit the operation of at least one of the at least one normal brake device, which is determined by the location and the number of the at least one defective brake device. For instance, it is desirable to inhibit the operation of the normal brake device located on one side of the vehicle opposite to the side on which at least one of the at least one defective brake device is located. In this case, the braking force difference on the opposite sides of the vehicle can be reduced, and the amount of reduction of the vehicle running stability due to the defect of at least one brake to device can be reduced.

(14) A brake control apparatus according to the above mode (12) or (13), wherein the emergency brake control portion includes a first braking-force restricting portion for controlling a braking force to be generated by each of the above-indicated at least one of the at least one normal brake device such that the braking force is smaller when the detected running speed of the vehicle is higher than a predetermined threshold than when the detected running speed is not higher than the predetermined threshold.

(15) A brake control apparatus according to any one of the above modes (13) or (14), wherein the emergency brake control portion includes a second braking-force restricting portion for determining the threshold value such that the threshold value is smaller when the number of the at least one defective brake device is relatively large than when the number is relatively small.

(16) A brake control apparatus for controlling a plurality of brake devices for braking respective wheels of an automotive vehicle, wherein an emergency brake control portion is provided for controlling at least one normal brake device of said plurality of brake devices when at least one of the plurality of brake devices is defective, such that a braking force to be generated by each of at least one of the at least one normal brake device is controlled on the basis of a detected steering state of the vehicle.

In the brake control apparatus according to the above mode (16) wherein the braking force of each of at least one of the at least one normal brake device is controlled on the basis of the detected steering state of the vehicle, it is possible to reduce the amount of reduction of the total vehicle braking force due to the defect of the at least one defective brake device, while maintaining the vehicle running stability at a substantially acceptable level.

The brake control apparatus according to the above mode (16) may include the technical feature according to any one of the above modes (1)–(15).

(17) A brake control apparatus according to the above mode (16), wherein the emergency brake control portion includes a third braking-force restricting portion for controlling at least one of the at least one normal brake device which is located on one of opposite sides of the vehicle which is opposite to the other side on which one of the at least one defective brake device is located, such that a braking force to be generated by each of the at least one of the at least one normal brake device located on the above-indicated one of opposite sides of the vehicle is made smaller when the above-indicated one of the at least one defective brake device which is located on the above-indicated other side of the vehicle is located on an outer side of a path of turning of the vehicle than when the above-indicated one of the at least one defective vehicle is located on an inner side of the path of turning of the vehicle.

(18) A brake control apparatus according to the above mode (17), wherein the third braking-force restricting portion controls the braking force to be generated by the each of the at least one of the at least one normal brake device such that the braking force is smaller when a detected steering angle of the vehicle is relatively large than when the detected steering angle is relatively small.

(19) A brake control apparatus according to any one of the above modes (16)–(18), wherein the emergency brake control portion further includes a running-speed-based brake control portion for controlling the braking force to be generated by each of the above-indicated at least one of the at least one normal brake device, on the basis of a detected running speed of the vehicle.

In the brake control apparatus according to the above mode (19) wherein the braking force of the selected normal brake device or devices is controlled on the basis of the detected vehicle running speed as well as the detected vehicle steering state, the reduction of the running stability of the vehicle due to the at least one defective brake device can be further reduced.

(20) A brake control apparatus for controlling a plurality of primary brake devices for braking respective wheels of an automotive vehicle, and at least one secondary brake device provided for at least one of said wheels, respectively, said brake control apparatus comprising an emergency brake control portion operable when at least one of the plurality of primary brake devices is defective, for operating at least one of the at least one secondary brake device which corresponds to at least one of the at least one defective primary brake device.

In the brake control apparatus according to the above mode (20) wherein the secondary brake device corresponding a defective one of the primary brake device is operated, the amount of reduction of the total vehicle braking force due to the defective primary brake device can be reduced, and the braking force difference on the opposite sides of the vehicle can be reduced so as to reduce the deterioration of the vehicle running stability, than where the secondary brake device is not operated.

For instance, the primary brake devices are used as service brake devices while the secondary brake device or devices is/are used as a parking brake device or devices. One and the other of the primary brake device and the secondary brake device which are provided for the same wheel may include a disc brake and a drum brake, respectively. Where wheel drive motors are provided for the respective wheels, one and the other of the primary and secondary brake devices for the same wheel may include a regenerative brake and a disc brake, respectively.

The brake control apparatus according to the above mode (20) may include the technical feature according to any one of the above modes (1)–(19).

(21) A brake control apparatus according to the above mode (20), wherein the emergency brake control portion includes an emergency primary-braking-force control portion for controlling a braking force to be generated by each of at least one normal primary brake device of the plurality of primary brake devices, so that a running stability of the vehicle as represented by a detected running condition of the vehicle is higher than a predetermined threshold.

In the brake control apparatus according to the above mode (20) wherein the braking force of at least one normal primary brake device is controlled as well as the secondary brake device corresponding to the defective primary brake device is operated, the running stability of the vehicle can be maintained at a relatively high level.

(22) A brake control apparatus according to the above mode (21), wherein the emergency primary-braking-force control portion controls the braking force to be generated by each of,the above-indicated at least one normal primary brake device, on the basis of the detected running condition of the vehicle.

(23) A brake control apparatus according to any one of the above modes (20)–(22), wherein the emergency brake control portion includes a braking-force-difference reducing type brake control portion for controlling at least one of braking forces to be generated by the primary and secondary brake devices which are normal, such that a difference between a total left-side braking force to be generated by all of at least one of the primary and secondary brake devices that is located on a left side of the vehicle and a total right-side braking force to be generated by all of the other of the primary and secondary brake devices that is located on a right side of the vehicle will not exceed than a predetermined threshold.

Where at least one of the plurality of primary brake devices is defective, the braking force difference on the left and right sides of the vehicle can be reduced by controlling at least one of the braking forces to be generated by the primary and secondary brake devices.

In the case where the maximum braking forces that can be generated by the primary and secondary brake devices are different from each other, for instance, where the maximum braking force of each secondary brake device is smaller that that of each primary brake device, the operation of the secondary brake device corresponding to the defective primary brake device may still cause a difference between the total braking forces on the left and right sides of the vehicle. In view of this fact, the emergency brake control portion according to the above mode (23) includes the braking-force-difference reducing type control portion adapted to control the braking force to be generated by an appropriate one or ones of the normal primary and secondary brake devices, for example, the braking force to be generated by at least one of the normal primary brake devices, so as to reduce the braking force difference on the left and right sides of the vehicle. Accordingly, the reduction of the vehicle running stability due to the defective primary brake device or devices can be reduced. The braking-force-difference reducing type control portion may be adapted to operate the selected one or ones of the normal primary and secondary brake devices with a suitable duty ratio, namely, alternately turn on and off the brake device or devices such that the predetermined braking force is generated for a predetermined first length of time and is zeroed for a predetermined second length of time.

A determination as to whether the difference between the total left and right braking forces indicated above is larger than the predetermined threshold or not may be effected on the basis of the actually detected braking forces generated by all of the normal brake devices, or alternatively on the basis of the detected steering state of the vehicle. The braking forces can be directly detected on the basis of the force by which the friction member is forced against the wheel rotor, for instance, or indirectly detected on the basis of the commanded braking force value. The steering state of the vehicle can be represented by the detected yaw rate of the vehicle or the steering angle of the front wheels or steering wheel. If the detected yaw rate or steering angle is higher or larger than a predetermined upper limit, the braking force difference is considered to be larger than the predetermined threshold.

In a braking system wherein four sets of a primary brake device and a secondary brake device are provided for braking respective front left, front right, rear left and rear right wheels, the two primary brake devices for the front and rear wheels on one of opposite sides of the vehicle may be defective. In this case, the secondary brake devices for those front and rear wheels on the same side of the vehicle may be operated. In this control arrangement, however, there arises a considerably large difference between the total braking forces on the opposite sides of the vehicle, since the two secondary brakes are operated on one side of the vehicle while the two primary brakes are operated on the other side of the vehicle. To reduce the braking force difference and thereby improve the vehicle running stability, the braking-force-difference reducing type control portion may be adapted to restrict or zero the braking force to be generated by one of the two primary brake devices.

(24) A brake control apparatus according to the above mode (23), wherein the braking-force-difference reducing type control portion includes a primary-braking-force restricting portion for operating all of the at least one secondary brake device that corresponds to all of the at least one defective primary brake device, and restricting the braking force to be generated by each of at least one of normal ones of the primary brake devices.

In the brake control apparatus according to the above mode (24), the secondary brake device corresponding to each defective primary brake device is operated, and the braking force to be generated by at least one normal primary brake device is restricted when the operation of the secondary brake device or devices is not likely to reduce the braking force difference on the left and right sides of the vehicle to a value smaller than the predetermined threshold. Accordingly, the braking force difference can be reduced.

(25) A brake control apparatus according to the above mode (24), wherein the primary-braking-force restricting portion restricts the braking force to be generated by each of the at least one normal primary brake device, when a running stability of the vehicle as represented by a detected running condition of the vehicle is lower than a predetermined threshold.

The brake control apparatus according to the above mode (25) makes it possible to avoid an unnecessary restriction of the braking force of the normal primary brake device or devices.

(26) A brake control apparatus according to any one of the above modes (20)–(25), wherein the emergency brake control portion includes a braking-force reduction restricting control portion for controlling at least one of braking forces to be generated by the primary and second brake devices, so that a total braking force to be applied to the vehicle is not smaller than a desired braking force value as represented by an amount of operation of a brake operating member by an operator of the vehicle.

If the operation of the defective primary brake device is inhibited while the corresponding secondary brake device is operated, the total braking force to be applied to the vehicle may be smaller than the total braking force value desired by the vehicle operator. If the defective primary brake device is not inhibited from being operated but is also commanded to be operated together with the corresponding secondary brake device, the total braking force may be increased owing to a braking force that may be generated by the defective primary brake device

(27) A brake control apparatus according to any one of the above modes (20)–(26), wherein the at least one secondary brake device consists of a plurality of secondary brake devices which are provided for the wheels, respectively, and which correspond to the plurality of primary brake devices, respectively, the primary and secondary brake devices for each of the wheels are connected to respective different power sources.

In the brake control apparatus according to the above mode (27) wherein the primary and second brake devices of each wheel are connected to the different power sources, one of the primary and secondary brake devices can be operated even when one of the power sources which corresponds to the other brake device is defective. Namely, one of the primary and secondary brake devices can be operated with a normal one of the two power sources, to brake the wheel, even when the other power source is defective. The primary and secondary brake devices may include an electrically operated actuator as described above with respect to the above mode (11). In this case, the electrically operated actuators of the primary and secondary brake devices are supplied with an electric energy by the respective different power sources.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIG. 1 is a view showing a brake control apparatus for an automotive vehicle according to one embodiment of this invention, and components connected to the apparatus;

FIG. 2 is a view illustrating a control data map indicative of a relation between the location of a normal electrically operated wheel brake whose operation is inhibited according to an emergency control program stored in a ROM of a main control device of the brake control apparatus of FIG. 1 when at least one of the electrically operated wheel brakes is defective, and the location of the defective at least one wheel brake;

FIGS. 3A and 3B are views indicating control data maps stored in the ROM of the main control device and representing control boundary lines indicative of relationships between running speed and steering angle of the vehicle, which boundary lines are used to determine whether operation of normal rear wheel brake is either permitted or inhibited;

FIG. 4 is a flow chart illustrating a portion of a control program stored in the ROM, for controlling the electrically operated wheel brakes;

Figure 7:
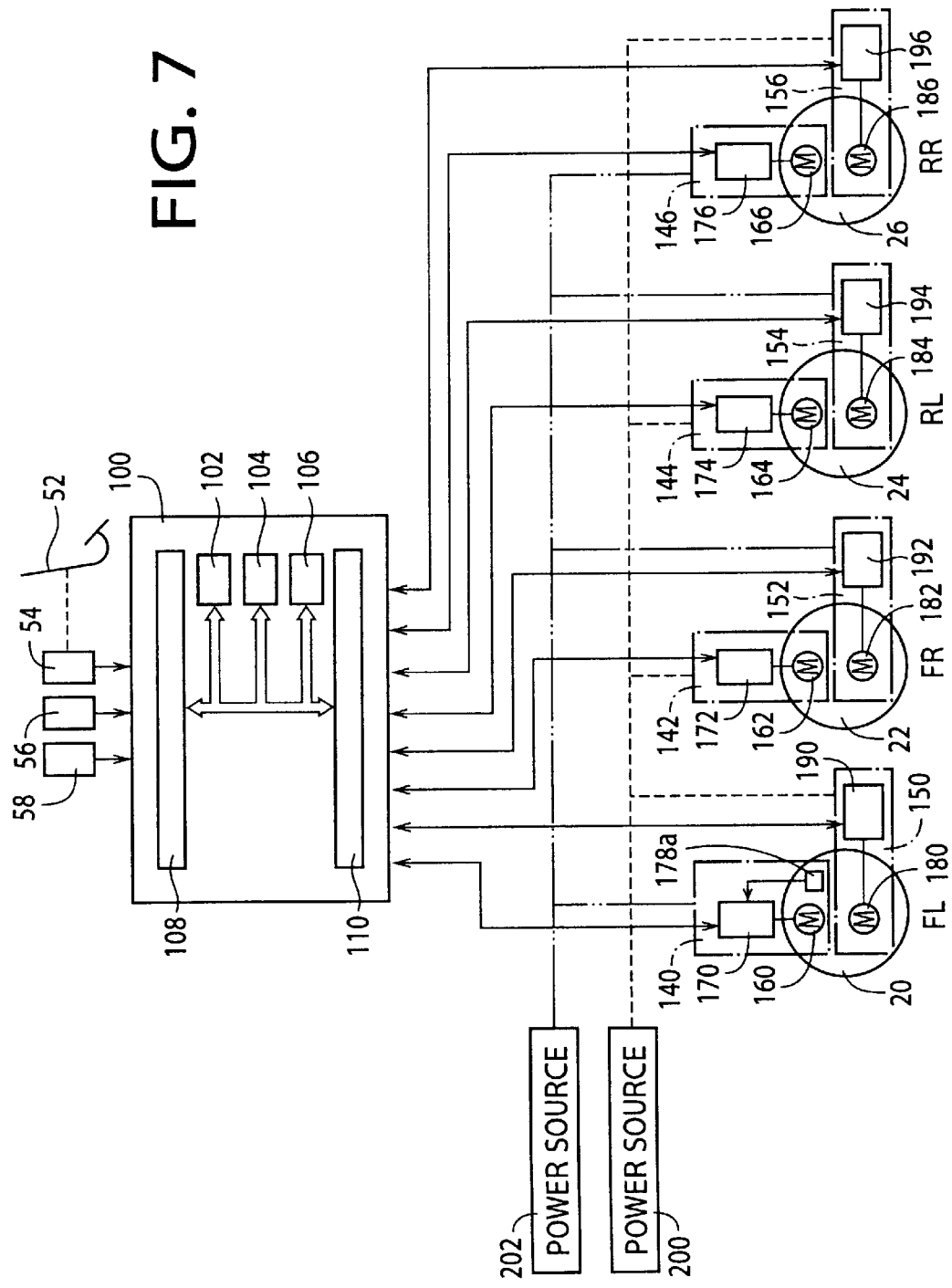
FIG. 7 is a view showing a brake control apparatus according to another embodiment of this invention, and components connected to the apparatus.
Figure 9:
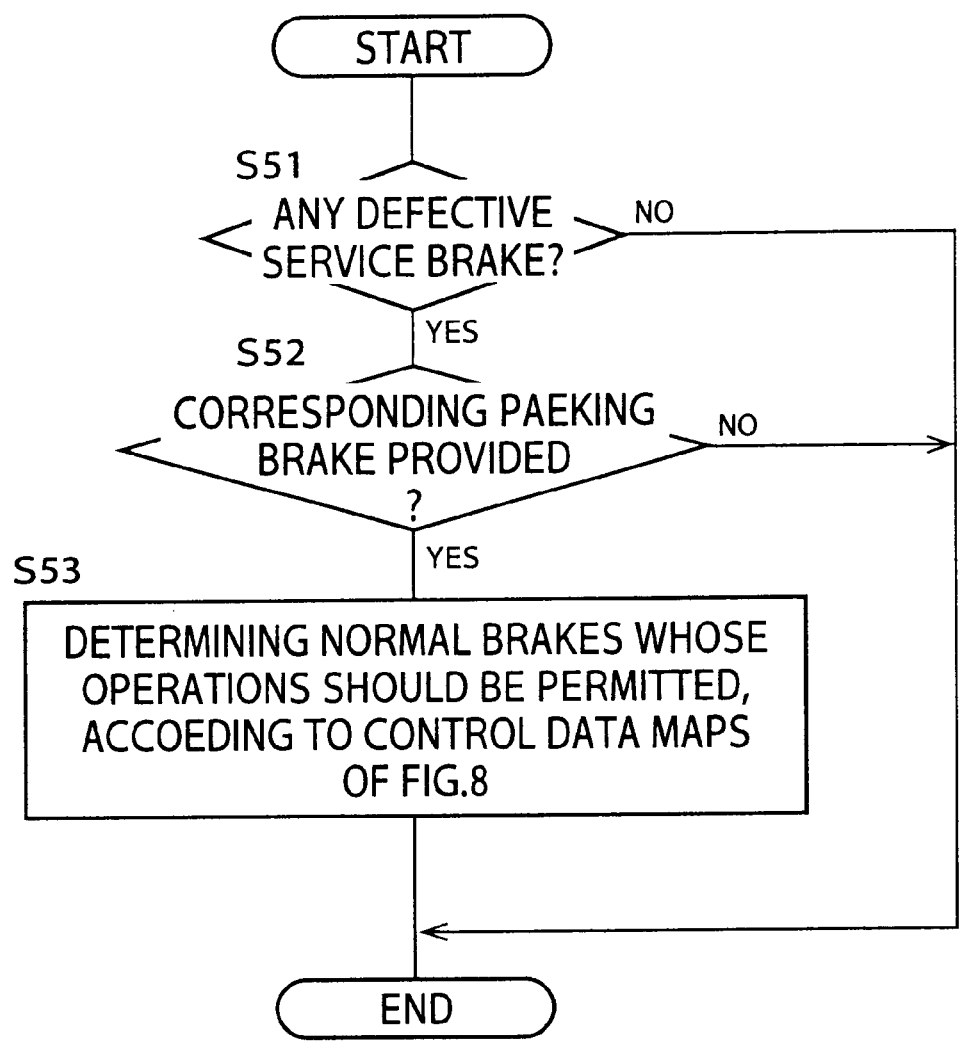
Figure 11:
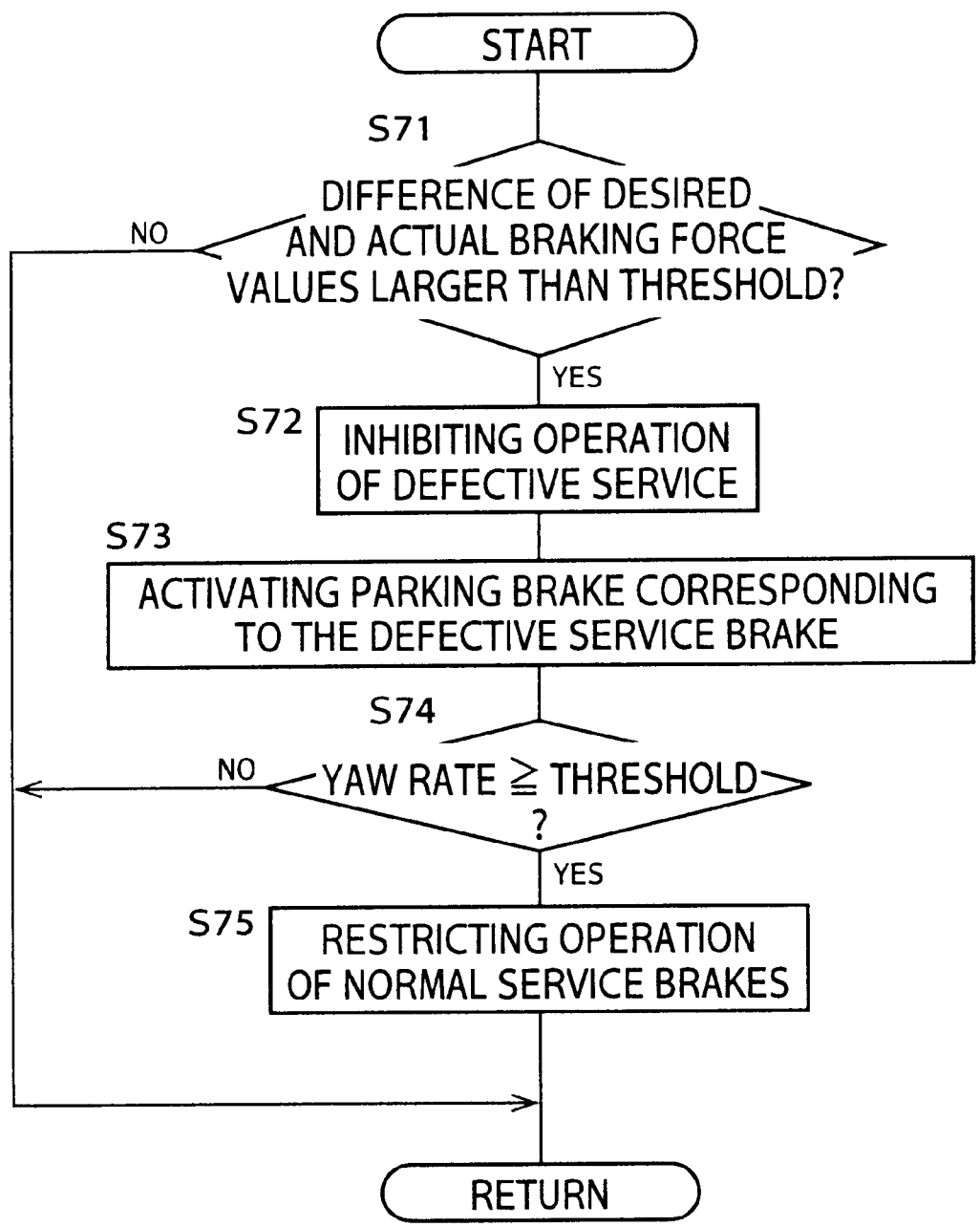

FIG. 8 is a view illustrating a control data map indicative of a relation between the location of defective electrically operated service brakes and the location of normal electrically operated service brakes and electrically operated parking brakes whose operations are permitted according to an emergency control program stored in a ROM of a main control device of the brake control apparatus of FIG. 7;

FIG. 9 is a flow chart illustrating a control program stored in the ROM of the main control device of the apparatus of FIG. 7, for controlling the electrically operated brakes;

FIG. 10 is a view corresponding that of FIG. 8, showing an emergency control program executed by a brake control apparatus according to a further embodiment of this invention: and FIG. 11 is a flow chart illustrating a control program stored in the ROM of the main control device of an apparatus of the embodiment of FIG. 10.

DETAILED DESCRIPTION OF THE PREFERRED EMBODIMENTS

Referring first to FIGS. 1–6, there is shown a brake control apparatus constructed according to a first embodiment of this invention as applied to an electrically operated braking system for an automotive vehicle.

Figure 1:
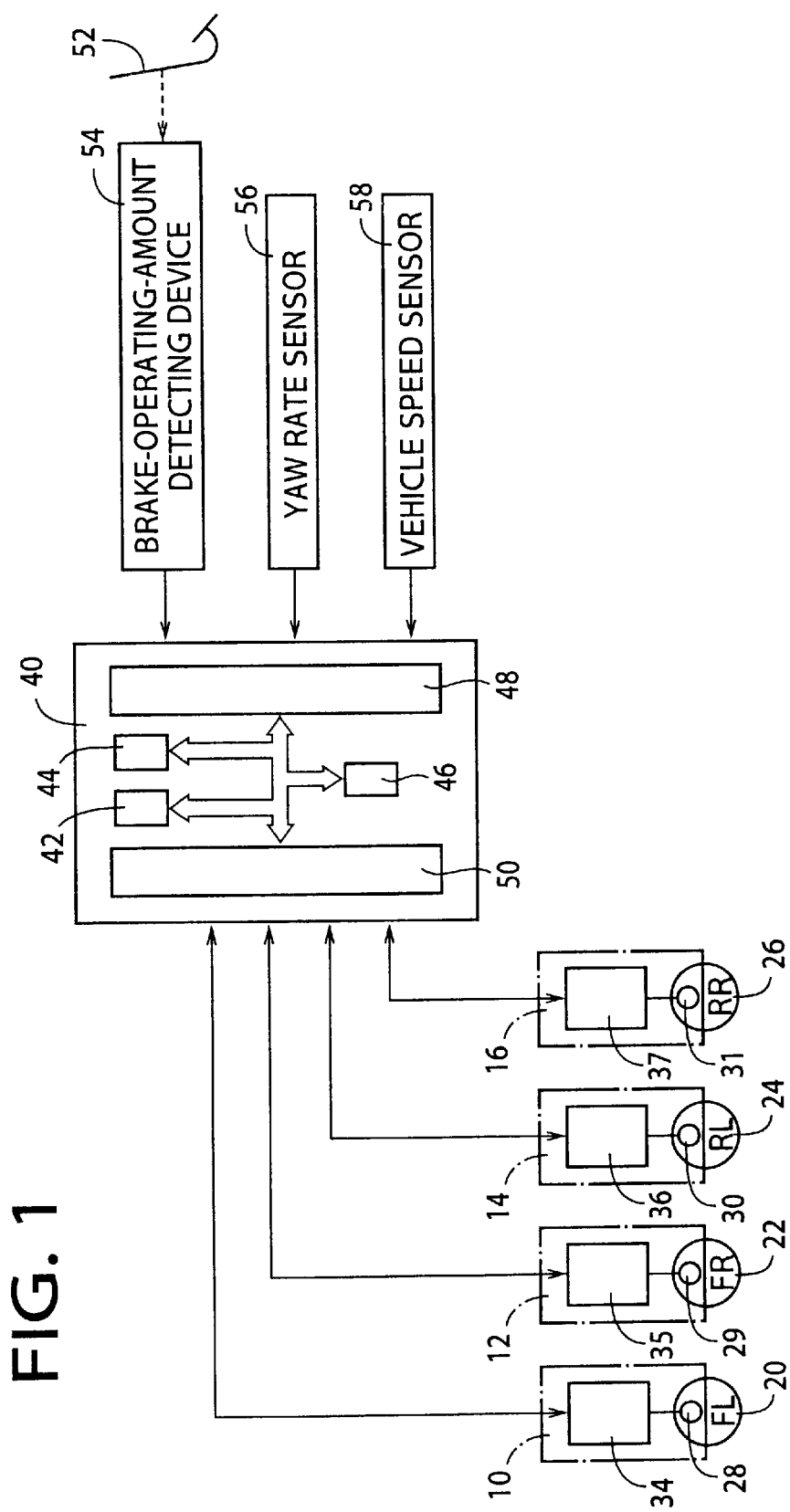

As shown in FIG. 1, the electrically braking system includes four brake devices in the form of electrically operated wheel brakes 10, 12, 14 and 16 provided for a front left wheel 20, a front right wheel 22, a rear left wheel 24 and a rear right wheel 26, respectively. The wheel brakes 10, 12, 14, 16 include respective electrically operated and controlled actuators in the form of electric motors 28, 29, 30 and 31, respective motor controllers 34, 35, 36, 37 for controlling the respective electric motors 28–31, and at least one motor operation sensor for detecting the operating state of the corresponding electric motor 28, 29, 30, 31. Each wheel brake 10, 12, 14, 16 is equipped with friction members which are forced against a rotor rotating with the corresponding wheel 20, 22, 24, 26, upon operation of the corresponding electric motor 28–31, for generating a braking force for braking the corresponding wheel 20–26. The friction members are supported by the body of the automotive vehicle such that the friction members are not rotatable relative to the vehicle body. A force by which the friction members are forced against the rotor is controlled by controlling an amount of electric current to be applied to the corresponding electric motor 28–31, so that the braking force to be generated by each wheel brake 10–16 is controllable.

Each of the motor controllers 34–37 includes a computer portion principally constituted by a computer, and a driver circuit, and is arranged to control the corresponding electric motor 28–31 according to control signals or data received from a main control device 40. Each motor controller 34–37 also receives the output signal of the at least one motor operation sensor indicated above, and diagnose the corresponding electric motor 28–31 for any defect or abnormality thereof, on the basis of the received output signal indicative of the operating state of the electric motor. The motor controllers 34–37 apply signals indicative of results of the diagnosis to the main control device 40.

For instance, each motor controller 34–37 is adapted to diagnose the corresponding electric motor 28–31 to determine whether the electric motor is defective or not, on the basis of a relationship between the amount of electric current applied to the electric motor 28–31 and the operating state of the same. In the present embodiment, the motor controller executes an initial diagnosis to diagnose the corresponding motor 28–31 when the ignition switch of the automotive vehicle has been turned on. It will be understood that the motor controllers 34–37 and the above-indicated motor operation sensors cooperate to constitute a major portion of a brake diagnosing device for diagnosing the wheel brakes 10–16 to determine whether each of these wheel brakes is defective or not.

The brake diagnosing device may further include a suitable sensor for diagnosing the mechanical components of each wheel brake 10–16. The provision of this sensor as well as the motor operation sensor or sensors assures improved accuracy of diagnosis of each wheel brake 10–16. The main control device 40 is constituted principally by a computer that incorporates a CPU 42, a ROM 44, a RAM 46, an input interface 48 and an output interface 50. To the input interface 48, there are connected a brake-operating-amount detecting device 54 for detecting the operating amount of a brake operating member in the form of a brake pedal 52, a yaw rate sensor 56 for detecting the yaw rate of the vehicle, and a vehicle speed sensor 58 for detecting the running speed V of the vehicle.

The brake-operating-amount detecting device 54 is adapted to detect the operating stroke or force of the brake pedal 52. The yaw rate to be detected by the yaw rate sensor 56 is a velocity at which the vehicle is rotated in the horizontal plane about a vertical axis which passes the center of the vehicle in the horizontal plane. The steering angle of the front wheels 20, 22 can be calculated on the basis of the detected yaw rate and vehicle speed, and data indicating the construction of the vehicle. The vehicle speed sensor 58 may be adapted to detect the vehicle running speed on the basis of either the detected rotating speed of the wheels 20–26 or the detected rotating sped of the output shaft of a vehicle drive device.

In the present braking system, each electrically operated wheel brake 10–16 is operated upon application of an electric current to the corresponding electric motor 28–31, to generate a braking force, but is not mechanically operated based on the operating force applied to the brake pedal 52. Accordingly, where a given one of the electric motors 28–31 is defective, for instance, the corresponding brake does not generate a braking force even with an electric energy supplied to the defective electric motor. In the present embodiment, each motor controller 34–37 is arranged to control the amount of electric current to be applied to the corresponding electric motor 28–31, such that the braking force to be generated by the corresponding wheel brake 10–16 is commensurate or proportional with the operating amount of the brake pedal 52. However, the electric motor may be controlled such that the generated braking force is not commensurate with the operating amount of the brake pedal 52.

When at least one of the electrically operated wheel brakes 10–16 is detected to be defective, the other normal wheel brakes 10–16 are controlled in a predetermined manner according to the principle of the present invention. The control of the wheel brakes 10–16 when any of the wheel brakes 10–16 is defective will be referred to as "emergency control operations" of the wheel brakes.

The emergency control operations of the wheel brakes 10–16 will be described by reference to FIG. 2 and FIGS. 3A and 3B.

Where one of the rear wheel brakes 14, 16 for the rear wheels 24, 26 is found defective, all of the other three normal wheel brakes 10, 12, and 14 or 16 are permitted to be operated for braking the two front wheels 20, 22 and one of the rear wheels 24, 26, so that the running vehicle can be braked with sufficiently high running stability.

Where one of the front wheel brakes 10, 12 for the front wheels 20, 22 is found defective, the other normal front brake 10, 12 and one of the rear wheel brakes 14, 16 which is on the same side of the vehicle as the defective front wheel brake 10, 12 are permitted to be operated (in a predetermined restricted manner as described below), and the operation of the other rear wheel 14, 16 on the other side of the vehicle is either permitted (also in the restricted manner) or inhibited depending upon the detected vehicle speed and steering angle. Where the wheel brake 10 for the front left wheel 20 is found defective, for instance, the normal wheel brake 16 for the rear right wheel 26 is permitted to be operated in the restricted manner, when an operation of the normal rear right wheel brake 16 in the present vehicle running condition as represented by the presently detected running speed and steering angle is not likely to deteriorate the running stability of the vehicle. When the operation of the normal rear right wheel brake 16 in the present vehicle running condition is likely to deteriorate the vehicle running stability, the operation of this wheel brake 16 is inhibited. The manner of determining whether the vehicle running stability in the present running condition is like to be deteriorated or not will be described in detail by reference to FIGS. 3A and 3B.

Where the wheel brake 12 for the front right wheel 22 is found defective, the other normal front left brake 10 and the rear right wheel brake 16 which is on the same side of the vehicle as the defective front right wheel brake 12 are permitted to be operated, and the operation of the other rear wheel 14 on the other side of the vehicle is either permitted or inhibited depending upon the detected vehicle speed and steering angle.

The emergency control operations of the wheel brakes 10–16 when two of the four wheel brakes 10–16 are defective will then be described.

Where one of the front wheel brakes 10, 12 and one of the rear wheel brakes 14, 16 are found defective, the normal two wheel brakes are permitted to be operated. In this case, there is not a large difference between the total braking force generated by the two left wheels 10, 14 and that generated by the two right wheels 12, 16.

Namely, where the wheel brakes 14, 16 for the rear left and right wheels 24, 26 are found defective, the operations of the wheel brakes 10, 12 for the two front wheels 20, 22 are permitted. Where the wheel brakes 10, 12 for the front left and right wheels 20, 22 are found defective, the operations of the wheel brakes 14, 16 for the two rear wheels 24, 26 are permitted.

Where the wheel brakes 10, 16 for the front left wheel 20 and the rear right wheel 26 are found defective, the operations of the wheel brakes 12, 14 for the front right wheel 22 and the rear left wheel 24 are permitted. Where the wheel brakes 12, 14 for the front right and rear left wheels 22, 24 are found defective, the operations of the wheel brakes 10, 16 for the front left and rear right wheels 20, 26 are permitted.

Where the front and rear wheel brakes on the same side of the vehicle are both found defective, the normal other front wheel brake is permitted to be operated, and the operation of the normal other rear wheel brake is either permitted (in the predetermined restricted manner) or inhibited depending upon the detected vehicle speed and steering angle.

Namely, where the two wheel brakes 10, 14 for the front and rear left wheels 20, 24 are found defective, the wheel brake 12 for the normal front right wheel 22 is permitted to be operated, and the operation of the wheel brake 16 for the normal rear right wheel 26 is either permitted or inhibited. Where the two wheel brakes 12, 26 for the front and rear right wheels 22, 26 are found defective, the wheel brake 10 for the normal front left wheel 20 is permitted to be operated, and the operation of the wheel brake 14 for the normal rear left wheel 24 is either permitted or inhibited.

Referring to FIGS. 3A and 3B, there will be described the manner of effecting the determination as to whether the operation of the normal one of the rear wheel brakes 14, 16 or one of the two normal rear brakes 14, 16 in the present vehicle running condition represented by the detected vehicle speed and steering angle is likely to deteriorate the vehicle running stability or not when one or two of the four wheel brakes 10–16 is/are found defective. The vehicle running condition at a given point of time is represented by the running speed and steering angle detected at that point of time. In the rectangular coordinate system of FIGS. 3A and 3B wherein the vehicle speed V is taken along the ordinate while the steering angle $\delta$ is taken along the abscissa, the vehicle running condition is represented by a point defined by the detected values of the vehicle speed V and steering angle $\delta$. To effect the above-indicated determination, four boundary lines are represented by data maps stored in the ROM 44 of the main control device 40, as indicated by two solid lines and two one-dot chain lines in FIGS. 3A and 3B.

The boundary line indicated by the solid line in FIG. 3A is used to determine whether the operation of the rear right wheel brake 16 should be permitted or inhibited when the front left wheel brake 10 is found defective. The boundary line indicated by the one-dot chain line in FIG. 3A is used to determine whether the operation of the rear right wheel brake 16 should be permitted or inhibited when the front and rear left wheel brakes 10, 14 are found defective. The boundary line indicated by the solid line in FIG. 3B is used to determine whether the operation of the rear left wheel brake 14 should be permitted or inhibited when the front right wheel brake 12 is found defective, while the boundary line indicated by the one-dot chain line in FIG. 3B is used to determine whether the operation of the rear left wheel brake 14 should be permitted or inhibited when the front and rear right wheel brakes 12, 16 are found defective.

In the coordinate system of FIGS. 3A and 3B, the hatched areas on the upper side of the boundary lines indicate that the operation of the normal rear wheel brake 14, 16 in the present vehicle running condition is likely to deteriorate the vehicle running stability. Where the point defined by the currently detected vehicle speed V and steering angle 6 upon detection of one or two of the four wheel brakes 10–16 is located in the appropriate hatched area, the main control device 40 determines that the vehicle running stability is likely to be deteriorated if the rear left or right wheel brakes 14, 16 is operated, and therefore inhibits the operation of the normal rear wheel brake 14, 16.

Described more specifically, the operation of the rear left or right wheel brakes 14, 16 is inhibited if the vehicle is placed in a running condition in which a relatively large difference between the total left braking force applied to the two left wheels 20, 24 and the total right applied to the two right wheels 22, 26 is likely to deteriorate the running stability of the vehicle. However, the rear left or right wheel brake 14, 16 is permitted to be operated in the restricted manner if the vehicle is in a running condition in which a relatively large difference between the total left and right braking forces is not likely to deteriorate the vehicle running stability. Described in greater detail, the above-indicted boundary lines represent a threshold value V(δ) of the vehicle speed V above which the operation of the normal rear left or right wheel brake 14, 16 is inhibited, and below which the operation of the wheel brake 14, 16 is permitted. This threshold value V(δ) varies as a function of the steering angle, more precisely, decreases as with an increase in the absolute value of the steering angle δ. Accordingly, the operation of the normal rear wheel brake 14, 16 during running of the vehicle at a given vehicle speed V is less likely to be inhibited when the steering angle is relatively small, that is, when the threshold value V(δ) is relatively large. In other words, the operating of the normal rear wheel brake 14, 16 is less likely to deteriorate the running stability of the vehicle when the vehicle running speed V is relatively low and/or when the steering angle is relatively small.

It will be understood from the four boundary lines indicated in FIGS. 3A and 3B that the threshold value V(δ) of the vehicle running speed V above which the operation of the normal rear wheel brake 14, 16 is inhibited is determined by the location and the number of the defective one or ones of the wheel brakes 10–16, and the direction of turning of the vehicle and the steering angle of the front wheels 20, 22, that is, the steering direction and angle of the steering wheel. The steering angle determines the radius of a curve along which the vehicle is turning.

While the vehicle is turning, the threshold value V(δ) of the vehicle speed V is larger when the defective wheel brake or brakes is/are located on the inner side of the turning path or curve of the vehicle than when the defective wheel brake or brakes is/are located on the outer side of the turning path. When the defective wheel brake is located on the inner side of the vehicle turning path, the direction in which the yaw moment due to the vehicle running acts on the vehicle is opposite to the direction in which the yaw moment due to the difference between the front and right total braking forces acts on the vehicle, so that these two yaw moments are more or less offset by each other, preventing an excessive spinning tendency of the vehicle. When the defective wheel brake is located on the outer side of the vehicle turning path, the above-indicated two yaw moments act on the vehicle in the same direction, so that the vehicle is likely to suffer from an excessive spinning tendency and the running stability of the vehicle is likely to be deteriorated due to a relatively large difference between the left and right braking forces, which would arise if all of the normal wheel brakes are permitted to be operated.

When the defective wheel brake is located on the outer side of the turning path of the vehicle, the threshold value V(δ) is reduced in steps with an increase in the steering angle δ. Since the vehicle running stability is reduced with an increase in the steering angle 6, the threshold value V(δ) is reduced with an increase in the steering angle δ, in order to increase the likelihood of inhibiting the operation of the normal rear wheel brake 14, 16, for thereby reducing a possibility of an increase in the braking force difference on the left and right sides of the vehicle, to thereby reduce a risk of deterioration of the vehicle running stability when one or two of the four wheel brakes is/are defective.

Further, the threshold value V(δ) is reduced when two of the four wheel brakes 10–16 is defective than when only one of the four wheel brakes 10–16 is defective, more precisely, when the two left wheels 10, 14 or two right wheels 12, 16 are defective than when only one of the two front wheel brakes 10, 12 is defective. When the two left wheels 10, 14 or two right wheels 12, 16 are both defective, the difference between the total left braking force and the total right braking force tends to be larger, and the vehicle running stability is likely to be deteriorated even at a relatively low running speed of the vehicle, if the normal wheel brakes are all permitted to be operated. As described above, the boundary lines indicated by the solid lines in FIGS. 3A and 3B are used when only one of the front wheels 10, 12 is defective, while the boundary lines indicated by the one-dot chain lines are used when the two left wheel brakes 10, 14 or the two right wheel brakes 12, 16 are defective.

When one or two of the four wheel brakes 10–16 is/are found defective, the main control device 40 restricts the rate of change of the force by which the friction members are forced against the rotor in each of the normal wheel brakes whose operations are permitted, that is, restrict the rate of change of the braking force to be generated by each normal wheel brake the operation of which is permitted, so that the rates of increase and decrease of the braking forces to be applied from the normal wheel brakes to the corresponding wheels are restricted.

Figure 6:
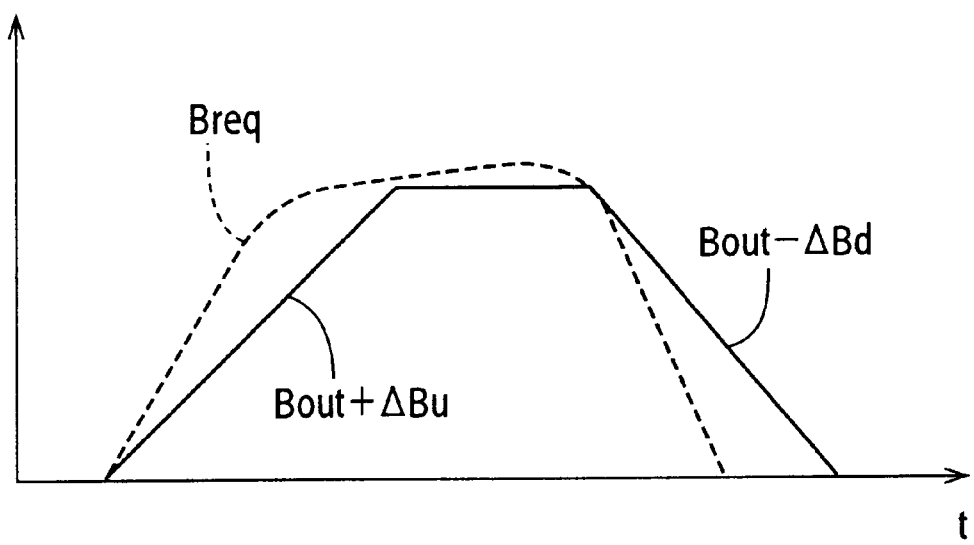
FIG. 6 is a view indicating a desired braking force represented by a control signal to be applied to a motor controller according to the control program of FIGS. 4 and 5.

When all of the four wheel brakes 10–16 are normal, the main control device 40 determines a desired or required braking force Breq to be generated by each wheel brake, on the basis of the amount of operation of the brake pedal 52, and applies to the corresponding motor controller 34–37 a control signal indicative of the determined desired braking force Breq as a commanded braking force Bout in the present control cycle. When at least one of the wheel brakes 10–16 is defective, a smaller one of the determined desired braking force Breq and a sum (Bout+ΔBu) is used as the commanded braking force Bout in the present control cycle for each of the normal wheel brakes (including the normal rear left or right wheel brakes 14, 16 whose operation is permitted depending upon the vehicle running condition), while the braking force generated by each normal wheel brake in question is in the process of being increased, as indicated in FIG. 6. The sum (Bout+ΔBu) is a sum of the commanded braking force value Bout used in the last control cycle, and a predetermined restricted amount A Bu of the increase rate of the braking force. While the braking force generated by each normal wheel brake in question is in the process of being reduced, a larger one of the determined desired braking force Breq and a difference (Bout−ΔBd) is used as the commanded braking force Bout in the present control cycle, as indicated in FIG. 6. The difference is equal to the commanded braking force value Bout used in the last control cycle minus a predetermined restricted amount ΔBd of the reduction rate of the braking force. The values (Bout+ΔBu) and (Bout−ΔBd) are referred to as "restricted braking force values".

Figure 5:
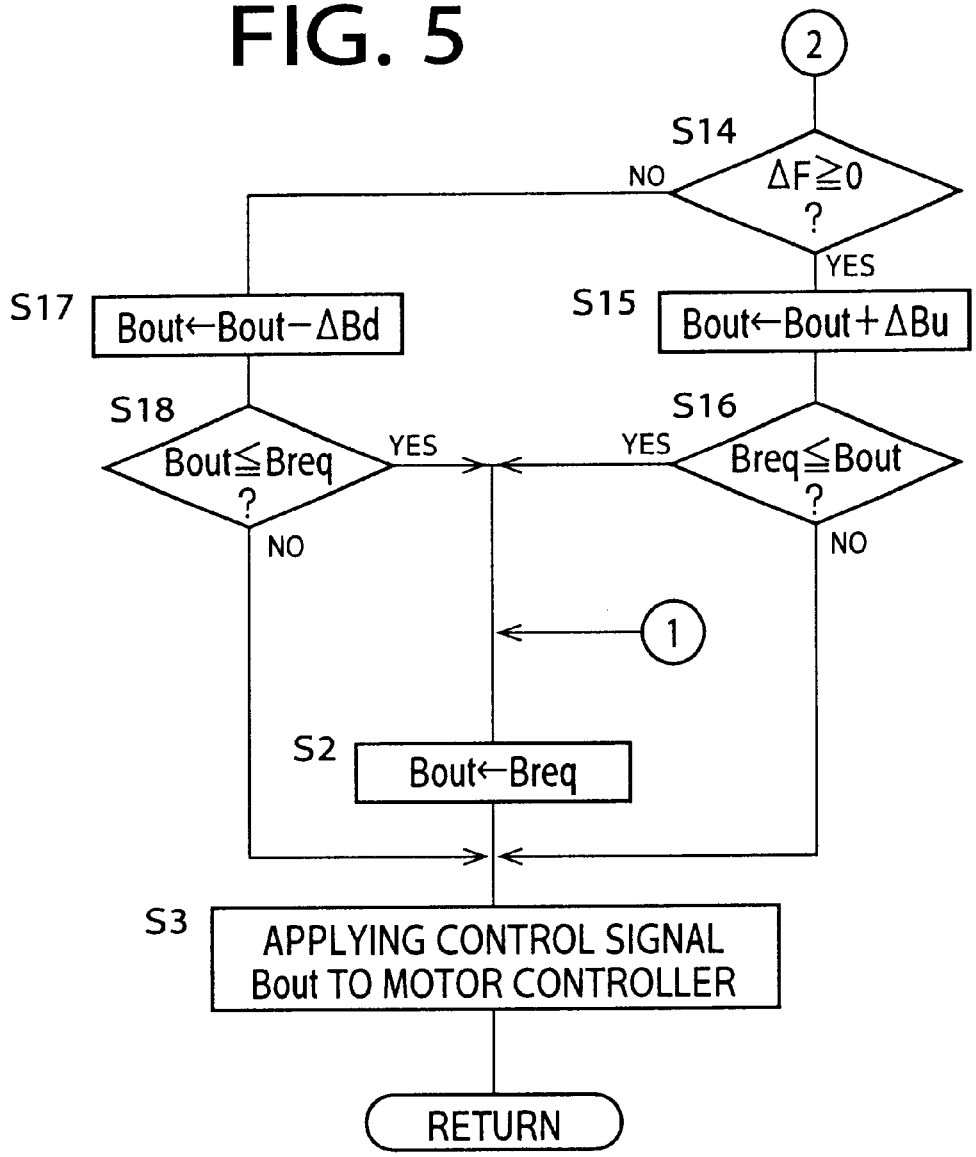
FIG. 5 is a flow chart illustrating another portion of the control program of FIG. 4.

For controlling the electrically operated wheel brakes 10–16, the brake control. apparatus including the main control device 40 is adapted to execute a wheel brake control routine illustrated in the flow charts of FIGS. 4 and 5, according to a wheel brake control program stored in the ROM 44. The wheel brake control routine is repeatedly executed as long as the brake pedal 52 is being operated.

The wheel brake control routine is initiated with step S1 to determine whether any one of the wheel brakes 10–16 is defective. In this step S1, the CPU 42 reads out from the RAM 46 diagnostic data indicative of the diagnostic results obtained in the initial diagnosis described above. When all of the four wheel brakes 10–16 are normal, a negative decision (NO) is obtained in step S1, and the control flow goes to step S2 (FIG. 5) in which the determined desired braking force Breq for each wheel brake is set as the commanded braking force Bout, and then goes to step S3 in which a signal indicative of the commanded braking force Bout=Breq is applied to the corresponding motor controller 34–37, so that the electric motors 28–31 are controlled in the normal manner to activate the corresponding wheel brakes 10–16, so that the desired braking force Breq is generated by each wheel brake.

Where at least one of the wheel brakes 10–16 is found defective, an affirmative decision (YES) is obtained in step S1, and the control flow goes to steps S4–S7 to identify the defective wheel brake or brakes, namely, determine the location of each of the at least one defective wheel brake. Where the front left and rear left wheel brakes 10, 14 are found defective, an affirmative decision (YES) is obtained in step S4, and the control flow goes to steps S8 and S9 to determine whether the operation of the normal rear right wheel brake 16 should be inhibited or not. Where the front right and rear right wheel brakes 12, 16 are found defective, an affirmative decision (YES) is obtained in step S6, and the control flow goes to steps S11 and S12 to determine whether the operation of the normal rear left wheel brake 14 should be inhibited or not. Where only the front left wheel brake 10 or the front right wheel brake 12 is found defective, an affirmative decision (YES) is obtained in step S5 or S7, and the control flow also goes to step S8 and S9, or steps S11 and 12, to determine whether the operation of the normal rear right or left wheel brake 16, 14 should be inhibited or not.

In steps S8 and S9, or steps S11 and S12, the determination as to whether the operation of the normal rear right or left wheel brake 16, 14 in the presently detected vehicle running condition is likely to deteriorate the vehicle running stability or not. Described in greater detail, the operation of the rear right or left wheel brake 16, 14 is permitted if the point defined by the detected vehicle speed V and steering angle δ is not located in the corresponding hatched area indicated in FIG. 3A or 3B, that is, if the point is located above the corresponding boundary line, since the operation of the normal rear right or left wheel brake 16, 14 in the present vehicle running condition is not likely to deteriorate the vehicle running stability, even if the difference between the total left and right braking forces is increased by the operation of the normal rear left or right wheel brake 16, 14. If the point defined by the vehicle speed V and steering angle δ is located below the corresponding boundary line, the operation of the normal rear right or left wheel brake 16, 14 is inhibited to prevent an increase in the difference between the total left and right braking forces, since the operation of this rear wheel brake 16, 14 in the present vehicle running condition is likely to deteriorate the vehicle running stability.

Where only the front wheel brake 10 for the front left wheel 20 is found defective, or where the wheel brakes 10, 14 for the front and rear left wheels 20, 24 are found defective, the CPU 42 reads out the vehicle running speed V and steering angle δ in step S8, and determine in step S8 whether the detected vehicle speed V is higher than the threshold value V2(δ) which is determined by the detected steering angle δ (both the absolute value and the sign). That is, step S8 is provided to determine whether the point defined by the detected vehicle speed V and steering angle δ falls within the hatched area indicated in FIG. 3A. If the detected vehicle speed V is not higher than the threshold value V2(δ), a negative decision (NO) is obtained in step S9, the control flow goes to steps S2 and S3 in which the operation of the normal rear right wheel brake 16 is not inhibited, so that the normal three wheel brakes 12, 14, 16 or normal two normal wheel brakes 12, 16 are permitted to be operated. If the vehicle speed V is higher than the threshold valve V2(δ), an affirmative decision (YES) is obtained in step S9, and the control flow goes to step S10 to inhibit the operation of the wheel brake 16 for the rear right wheel 26.

When the operation of the normal rear right wheel brake 16 is inhibited where only the front left wheel brake 10 is defective, the maximum deceleration value of the vehicle established by the braking system is 0.5 G, as indicated in parenthesis in the table of FIG. 2. When all of the three normal wheel brakes 12, 14, 16 are permitted to be operated where the front left wheel brake 10 is defective, the vehicle can be braked to establish the maximum deceleration value of 0.65 G, as also indicated in FIG. 2. Where the front and rear left wheel brakes 12, 14 are defective, the maximum vehicle deceleration value is 0.35 G when the operation of the normal rear right wheel brake 16 is inhibited, but is 0.5 G when the operations of the two normal wheel brakes 12, 16 are permitted.

Where only the front right wheel brake 12 is defective, or where the front and rear right wheel brakes 12, 16 are defective, a determination as to whether the operation of the rear left wheel brake 14 should be inhibited or not is effected in step S11 by determining whether the point defined by the detected vehicle speed V and steering angle δ is located within the hatched area indicated in FIG. 3B, that is, whether the detected vehicle speed V is higher than the threshold value V1(δ) determined by the steering angle 6. If a negative decision (NO) is obtained in step S12, the operation of the rear left wheel brake 14 is permitted, so that the normal three wheel brakes 10, 14, 16 or the normal two wheel brakes 10, 14 are operated. If an affirmative decision (YES) is obtained in step S12, the control flow goes to step S13 to inhibit the operation of the rear left wheel brake 14.

Further, the brake control apparatus according to the present embodiment of the invention is adapted to restrict the rate of change of the braking force to be generated by each of the normal ones of the wheel brakes 10–16, as indicated in FIG. 6, when any one of the wheel brakes 1–16 is found defective.

That is, when any one of the wheel brakes 10–16 is found defective, the control flow goes to step S14 to determine whether the operating amount F of the brake pedal 52 is held constant or in the process of being increased, namely, whether an amount of change ΔF of the operating amount F of the brake pedal 52 is equal to or larger than zero. If an affirmative decision (NO) is obtained in sep S14, the control flow goes to step S15 to calculate the restricted braking force value (Bout+ΔBu), which is a sum of the commanded braking force value Bout used in the last control cycle and the predetermined restricted amount ΔBu of the increase rate of the braking force. In step S15, the calculated restricted braking force value (Bout+ΔBu) is provisionally determined as the commanded braking force value Bout for the present control cycle. Step S15 is followed by step S16 to determine whether the desired braking force Breq determined on the basis of the operating amount F of the brake pedal 52 is equal to or smaller than the commanded braking force value Bout provisionally determined in step S15, which is equal to the calculated restricted braking force value (Bout+ΔBu). If the calculated restricted braking force value (Bout+ΔBu) which was provisionally determined in step S15 as the commanded braking force value Bout for the present control cycle is smaller than the desired braking force value Breq, a negative decision (NO) is obtained in step S16, and the control flow goes to step S3 in which the control signal indicative of the calculated restricted braking force value (Bout+ΔBu) is applied to the motor controller 34–37 of the normal wheel brake 10–16 in question. If the desired braking force value Breq is equal to or smaller than the restricted braking force value (Bout+ΔBu) or the provisionally determined commanded braking force value Bout, an affirmative decision (YES) is obtained in step S16, and the control flow goes to step S2 in which the desired braking force value Breq is determined as the commanded braking force value Bout for the present control cycle, and then goes to step S3 in which the control signal indicative of the determined commanded braking force value Bout=Breq is applied to the motor controller of the normal wheel brake in question.

Thus, the rate of increase of the commanded braking force value Bout is restricted to restricted the rate of increase of the actual braking force generated by the normal wheel brake, so that the rate of increase of the difference between the total left braking force and the total right braking force can be made low, namely, the difference is slowly or gradually increased. Accordingly, even if the running stability of the vehicle is deteriorated due to the difference of the braking force on the left and right sides of the vehicle, the vehicle operator can improve the rectify the running stability by manipulating the steering wheel.

While the operating amount F of the brake pedal 52 is in the process of being reduced, that is, if ΔF<0, a negative decision (NO) is obtained in step S14, and the control flow goes to step S17 to calculate the restricted braking force value (Bout−ΔBd) by subtracting the predetermined restricted amount ΔBd of the reduction rate of the braking force from the commanded braking force value Bout used in the last control cycle. In step S17, the calculated restricted braking force value (Bout−ΔBd) is provisionally determined as the commanded braking force value Bout for the present control cycle. Step S17 is followed by step S18 to determine whether the provisionally determined commanded braking force value Bout is equal to or smaller than the desired braking force value Breq corresponding to the operating amount F of the brake pedal 52. If a negative decision (NO) is obtained in step S18, the control flow goes to step S3 in which the control signal indicative of the restricted braking force value (Bout−ΔBd) is applied to the motor controller of the normal wheel brake in question. If an affirmative decision (YES) is obtained in step S18, the control flow goes to step S2 in which the desired braking force value Breq is determined as the commanded braking force value Bout, and then to step S3 in which the control signal indicative of the desired braking force value Breq is applied to the appropriate motor controller.

Thus, the rate of decrease of the commanded braking force value is restricted to restrict the rate of decrease of the actual braking force, so that the deterioration of the running stability of the vehicle can be reduced also in the process of reduction of the braking force.

Steps S2, S3 and S14–S18 of FIG. 5 are implemented for each of the normal ones of the wheel brakes 10–16. In this respect, it is noted that the operation of the rear left or right wheel brake 14 or 16 which was inhibited in the last control cycle may be permitted in the present control cycle. In this case, the decision in step S9 or S12 which has been affirmative (YES) in the previous control cycles becomes negative in the present control cycle, so that the operation of the rear wheel brake 14, 16 is permitted in the present control cycle, and the control signal indicative of the commanded braking force Bout is applied to the motor controller 36, 37. In this case, the commanded braking force value Bout in the last control cycle which is used in step S15 or S17 is zero. It is also noted that the operation of the rear left or right wheel brake 14, 16 which has been inhibited is permitted in the process of an increase in the operating force F of the brake pedal 52, in most cases, and is rarely permitted in the process of a decrease in the operating force F. Generally, a decrease in the actual braking force will results in an increase in the vehicle running speed V, increasing a possibility that the point defined by the detected vehicle speed V and steering angle 6 is held in the hatched area of inhibition indicated in FIGS. 3A and 3B. Accordingly, where the operation of the rear wheel brake 14, 16 which has been inhibited is permitted in the present control cycle, the affirmative decision (YES) is usually obtained in step S14, and the control flow goes to steps S15 and 16. Since the restricted braking force value (0+ΔBu) calculated in step S15 is smaller than the desired braking force value Breq, the negative decision (NO) is obtained in step S16, and the control signal indicative of the predetermined restricted amount ΔBu is applied to the motor controller 36, 37 of the rear wheel brake 14, 16 whose operation has been permitted. Thus, even if the number of the normal wheel brakes whose operations are permitted is increased from one to two, or from two to three, during brake application, only a small amount of braking force corresponding to the restricted amount ΔBu is generated by the rear wheel brake 14, 16 whose operation has been permitted in the present control cycle, so that an abrupt increase in the difference of the total left and right braking forces can be avoided, making it possible to prevent deterioration of the vehicle running stability.

According to the present brake control apparatus, when one or two of the wheel brakes 10–16 is defective, all of the normal wheel brakes are permitted to be operated if it is determined that the operations of all of the normal wheel brakes in the present running condition of the vehicle is not likely to deteriorate the vehicle running stability, or is likely to maintain the vehicle running stability at a substantially acceptable value, even if the operations of the normal wheel brakes result in a certain amount of difference in the braking force on the left and right sides of the vehicle. Accordingly, the present brake control apparatus permits effective utilization of the normal wheel brakes, and is effective to prevent a reduction in the total braking force to be generated by the braking system in the event where one or two of the wheel brakes 10–16 is/are defective. Further, the determination as to whether the operation of the normal rear left or right wheel brake 14, 16 should be inhibited or permitted is effected depending upon the detected running condition of the vehicle, so that the vehicle running stability can be maintained even when the operation of the rear wheel brake 14, 16 is permitted. In addition, each of the normal wheel brakes whose operations are permitted is controlled such that the rates of increase and reduction of the commanded braking force are restricted in an effort to reduce a rate of change of the difference between the total left braking force and the total right braking force, making it possible to reduce the deterioration of the vehicle running stability due to the braking force difference on the left and right sides of the vehicle.

It will be understood from the foregoing description of the present first embodiment of the invention that the motor controllers 3–37 and the main control device 40 including the ROM 44 storing the control data maps illustrated FIGS. 2 and 3 and the wheel brake control program illustrated in the flow chart of FIGS. 4 and 5 cooperate with each other to constitute an emergency brake control portion for controlling at least two normal brake devices when at least one brake device is defective, such that a difference between a total left-side braking force to be generated by at least one of the at least two normal brake devices which is located on the left side of the vehicle and a total right-side braking force to be generated by the other of the at least two normal brake devices which is located on the right side of the vehicle is made larger when operations of all of the at least two normal brake devices in the detected running condition of the vehicle are not likely to deteriorate the running stability of the vehicle, than when the operations of al of the at least two normal brake devices in the detected running condition are likely to deteriorate the running stability of the vehicle.

It will also be understood that the motor controllers 34–37 and the main control device 40 cooperate to constitute an emergency brake control portion for controlling at least one normal brake device when at least one brake device is defective, such that a braking force to be generated by each of at least one of the at least one normal brake device is controlled on the basis of the detected running speed of the vehicle.

It will further be understood that the motor controllers 34–37 and the main control device 40 cooperate to constitute an emergency brake control portion for controlling at least one normal brake device when at least one brake device is defective, such that a braking force to be generated by each of at least one of the at least one normal brake device is controlled on the basis of the detected steering state of the vehicle.

It will be understood that the emergency brake control portion includes a first braking-force restricting portion for controlling the braking force to be generated by each of at least one normal brake device such that this braking force is smaller when the detected running speed of the vehicle is higher than a predetermined threshold than when the detected running speed is not higher than the threshold. This first braking-force restricting portion is constituted by the motor controllers 34–37 and the main control device 40 which includes the ROM 44 storing the control data maps illustrated in FIGS. 2, 3A and 3B and a portion assigned to implement steps S1 and S4–S13 of the brake control program illustrated in the flow chart of FIGS. 4 and 5.

The emergency brake control portion may be adapted to control the at least one normal brake device such that all of the at least one normal brake device is permitted to be operated when the detected running speed of the vehicle is lower than a predetermined threshold and such that an operation of at least one of the at least one normal brake device is inhibited when the detected running speed is not lower than the predetermined threshold. In this case, the emergency brake control portion includes a second braking-force restricting portion for determining the threshold value such that the threshold value is smaller when the number of the at least one defective brake device is relatively large than when the number is relatively small.

It will also be understood that the emergency control portion includes a third braking-force restricting portion for controlling at least one normal brake device located on one of opposite sides of the vehicle which is remote from one of at least one defective brake device in the lateral direction of the vehicle, such that the braking force to be generated by each of the at least one normal brake device located on the above-indicated on side of the vehicle is made smaller when a wheel of the vehicle for which the above-indicated one defective brake device is provided is located on an outer side of a turning path of the vehicle than when the above-indicated wheel is located on an inner side of the turning path of the vehicle.

It will further be understood that the emergency brake control portion further includes a change-rate restricting portion for controlling at least one of a rate of increase and a rate of reduction of the braking force to be generated by each of the at least one normal brake device, such that each of the at least one of the rate of increase and the rate of reduction is lower when at least one brake device is found defective than when none of the brake devices is found defective. This change-rate restricting portion is constituted by the motor controllers 34–37 and the main control device 40 including a portion assigned implement steps S14–S18 of the flow charts of FIGS. 4 and 5.

It will also be understood that the yaw rate sensor 56, the vehicle speed sensor 58 and the main control device 40 including a portion assigned to implement steps S8, S9, S11 and S12 of the flow charts of FIGS. 4 and 5 and the ROM 44 storing the control data maps indicated in FIGS. 3A and 3B cooperate to constitute a running-condition detecting portion for effecting a determination as whether the operations of all of the at least two normal brake devices in the detected running condition of the vehicle are likely to deteriorate the running stability of the vehicle or not, on the basis of at least one of the detected running speed and steering state of the vehicle.

It will be understood that the running-condition detecting portion also serves as a turning-direction-based running-condition detecting portion. for effecting the above-indicated determination on the basis of the location of each of the at least one defective brake device and the turning direction of the vehicle.

While the first embodiment is adapted to change the threshold values $V1(\delta)$ and $V2(\delta)$ of the vehicle speed V in steps with the steering angle $\delta$, the threshold values may be changed continuously with the steering angle $\delta$. Further, the boundaries used to determine whether the operation of the right left or right wheel brake 14, 16 should be inhibited or permitted may be defined by the vehicle speed V and the yaw rate of the vehicle, or steering angle of the steering wheel or any physical quantity other than the steering angle of the front wheels 20, 22, which physical quantity represents the steering state of the vehicle.

In the illustrated first embodiment described above, the operation of the rear left or right wheel brake 14, 16 is completely inhibited if the operation of this wheel brake in the vehicle running condition is likely to deteriorate the vehicle running stability when one of the front wheel brakes 10, 12 is defective, for instance, However, the amount of operation of the rear left or right wheel brakes 14, 16 may be restricted when the non-restricted operation of this wheel brake is likely to deteriorate the vehicle running stability. In this case, for example, the amount of operation of the rear left or right wheel brake 14, 16, which is basically determined by the desired braking force value Breq corresponding to the operating amount of the brake pedal 52, is compensated for on the basis of at least one of the detected vehicle speed V and steering state, so that the wheel brake 14, 16 is operated in a restricted fashion.

In the illustrated first embodiment, the change-rate restricting control is effected according to steps S14–S18, S2 and S3 when any one of the wheel brakes 10–16 is found defective, that is, irrespective of whether the affirmative or negative decision is obtained in step S9 or S12, as long as the affirmative decision (YES) is obtained ins step S1. However, the change-rate restricting control may be effected only when the operation of the rear left or right wheel brake 14, 16 is permitted, that is, only when the negative decision (NO) is obtained in step S9 or S12.

Although the first embodiment is adapted to effect the change-rate restricting control (S14–S18, S2, S3) for all of the normal wheel brakes, the change-rate restricting control may be effected for only the rear left or right wheel brake 14, 16 the operation of which is permitted depending upon the detected vehicle running condition. The change-rate restricting control may be modified to restrict only one of the increase rate and the reduction rate of the braking force. While the restricted amounts $\Delta Bu$ and $\Delta Bd$ of the increase and reduction rates used in steps S15 and S17 are constant, at least one of these restricted amounts $\Delta Bu$ and $\Delta Bd$ may be changed depending upon the vehicle running condition. For example, at least one of the restricted amounts $\Delta Bu$ and $\Delta Bd$ may be increased with an increase in the vehicle running stability expected when all of the normal wheel brakes are operated in the presently detected vehicle running state is increased. This arrangement permits the actual braking force to be increased and/or reduced at a rate close to the nominal rate in the normal operation of the braking system, when the relatively high vehicle running stability is expected, and is also effective to prevent the deterioration of the vehicle running stability when the relatively low vehicle running stability is expected.

In the embodiment of FIG. 1, the brake control apparatus controls the electrically operated and controlled brake devices in the form of wheel brakes 10–16. However, the brake control device may be adapted to control hydraulically operated and electrically controlled brake devices each of which includes friction pads, and an electrically controlled hydraulic actuator for forcing the friction pads against a rotor rotating with the corresponding wheel. The electrically controlled hydraulic actuator includes a wheel brake cylinder, and a solenoid-operated pressure control device for controlling the fluid pressure applied to the wheel brake cylinder such that the fluid pressure changes with an electric current applied to the pressure control device. Thus, the braking force to be generated by the hydraulically operated and electrically controlled brake device for each wheel is controlled by electrically controlling the solenoid-operated pressure control device. In this case, the brake-operating-amount detecting device 54 may be constructed to either directly or indirectly detect the operating amount of the brake operating member in the form of the brake pedal 52. Where the brake operating member is operatively connected to a master cylinder which produces a hydraulic pressure corresponding to the operating force acting on the brake operating member, the operating amount of the brake operating member may be indirectly detected by a pressure sensor adapted to detect the fluid pressure in the master cylinder.

The electrically controlled hydraulic actuator including the wheel brake cylinder may further include a pump connected to the wheel brake cylinder, and an electrically operated pump motor for operating the pump. The braking force to be generated by the hydraulically operated brake device is controlled by controlling an electric current applied to the pump motor.

Each of the electrically controlled brake devices is not limited to the friction brake described above, but may be a regenerative brake including a vehicle drive electric motor which is arranged to drive the corresponding wheel and is adapted to provide a regenerative braking effect for braking the corresponding wheel. In this case, the vehicle drive electric motor must be provided for each of the vehicle wheels.

While the illustrated embodiment is adapted to repeatedly execute the wheel brake control routine according to the wheel brake control program during a brake application to the vehicle, the routine may be modified to implement steps S1 and S4–S13 only once upon initiation of the brake application, namely, upon initiation of an operation of the brake pedal 52, for the purpose of determining the brake control mode, and repeatedly implement steps S2, S3 and S14–S18 during the brake application, for the purpose of restricting the rate of change of the commanded braking force value Bout. In this case, the determination as to whether the rear left or right wheel brake 14, 16 should be permitted or inhibited is effected on the basis of the vehicle running condition when the brake pedal 52 is operated. It is also noted that it is not essential to effect both of the program (S1, S4–S13) for determining the brake control mode and the program (S2, S3 and S14–S18) for restricting the rte of change of the commanded braking force value Bout. Only one of these two programs may be executed.

In the first embodiment, the electrically operated wheel brakes 10–16 are diagnosed for detecting any defect thereof during the initial diagnosis of the braking system, and the wheel brake control routine is executed on the basis of a result of the initial diagnosis of the wheel brakes 10–14. However, the diagnosis of the wheel brakes 10–14 may be effected upon or during operation of parking brakes. In this case, a result of a diagnosis when the parking brakes are operated at a given point of time may be different from a result of a diagnosis when the parking brakes are subsequently operated.

Referring next FIGS. 7–9, there will be described a brake control apparatus according to a second embodiment of this invention, as applied to a braking system equipped with electrically operated parking brakes as well as electrically operated service brakes.

As shown in FIG. 1, the present brake control apparatus includes a main control device 100, which is principally constituted by a computer incorporating a CPU 102, a ROM 104, a RAM 106, an input portion 108 and an output portion 110. To the input portion 108, there are connected the brake-operating-amount detecting device 54, the yaw rate sensor 56 and the vehicle speed sensor 58, as in the first embodiment. To the output portion 110, there are connected electrically operated service brakes 140–146 and electrically operated parking brakes 150–156. The service brakes 140–146 include respective electrically operated actuators in the form of electric motors 160–166, respective motor controllers 170–176 for controlling the respective electric motors 160–166, and respective operating-state detectors 18a–178d for detecting the operating states of the respective service brakes 140–146. Each electric motor 160, 162, 164, 166 is provided to force friction pads against a disc rotor rotating with the corresponding wheel 20–26. The friction pads are movably supported by a mounting bracket such that the friction pads are not rotatable relative to the mounting bracket. The electrically operated parking brakes 150–156 include respective electrically operated actuators in the form of electric motors 180–186, and respective motor controllers 190–196 for controlling the respective electric motors 180–186. Each electric motor 180, 182, 184, 186 is provided to force friction pads in the form of shoes against the inner circumferential surface of a brake drum rotating with the corresponding vehicle wheel 20–26. The shoes are pivotally supported by a backing plate such that the shoes are not pivotable relative to the backing plate. Thus, each vehicle wheel 20–26 is equipped with the electrically operated service and parking brakes in the form of a disk brake and a drum brake.

Each of the operating-state detecting devices 178a–178d provided for the respective service brakes 140–146 is adapted to detect the operating state of the corresponding electric motor 160–166 and/or the operating state of the disc brake mechanism. For instance, the detecting device 178a–178d includes a pressing force sensor for detecting a pressing force by which the friction pads are forced onto the disc rotor. The pressing force detected by the pressing force sensor represents the actual braking force generated by the service brake 140–146 for braking the corresponding wheel 20–26. In this respect, it is noted that the parking brakes 150–156 are normally not operated while the service brakes 140–146 are operated during vehicle running. If the actual braking force is substantially equal to the desired braking force as represented by the operating amount of the brake pedal 52, the service brake 140–146 in question is considered to be normal. The operating-state detecting device 178a–178d may include a torque sensor for detecting the torque which acts on the mounting bracket of the disc brake. The detected torque acting on the mounting bracket represents the braking force actually applied to the corresponding wheel 20–26.

The operating-state detecting device 178a–178d may further include an ammeter for detecting the electric current applied to the corresponding electric motor 160–166, an encoder for detecting the rotating speed of the corresponding electric motor 160–166, and a position sensor for detecting the position of a presser member which is driven by the corresponding electric motor to force the friction pads onto the disc rotor. The detected electric current represents a load acting on the electric motor, and the actual braking force generated can be obtained on the basis of the load. The actual braking force can also be obtained on the basis of the detected position of the presser member relative to the disc rotor. Without the position sensor, the position of the presser member can be calculated on the basis of the number of revolutions of the rotor or output shaft of the electric motor while the presser member is moved form its fully retracted position to the advanced position.

The electrically operated service brake 140–146 may be diagnosed on the basis of the detected electric current applied to the electric motor 160–166 and the operating state of the electric motor 160–166, in place of the detected actual braking force. If the operating state of the electric motor is commensurate with the amount of electric current applied to the electric motor, the electric motor and the corresponding service brake are considered to be normal.

The determination as to whether each electrically operated service brake 140–146 is normal or defective may be effected on the basis of both a diagnosis of the corresponding electric motor 160–166 and a diagnosis of the disc brake mechanism.

In the present second embodiment, the electrically operated service brakes 149–146 function as primary brake devices, while the electrically operated parking brakes 150–156 function as secondary brake devices.

A power source 200 is connected to the service brake 142 for the front right wheel 22, the service brake 144 for the rear left wheel 24, the parking brake 150 for the front left wheel 20 and the parking brake 156 for the rear right wheel 26, while another power source 202 is connected to the service brake 140 for the front left wheel 20, the service brake 146 for the rear right wheel 26, the parking brake 152 for the front right wheel 22 and the parking brake 154 for the rear left wheel 24. In this arrangement wherein some of the brake devices are connected to one of the two power sources 200, 202 while the other brake devices are connected to the other power source, the braking system can be operated with an electric energy supplied from a normal one of the two power sources 200, 202 even in the event of a failure of the other power source 200, 202. Further, the service and parking brakes provided for each wheel are connected to one and the other of the two power sources 200, 202, the wheel can be braked by one of the service and parking brakes even in the event of a failure of one of the two power sources. The braking system may be provided with a plurality of main control devices each principally constituted by a computer, and the main control device 100 may be provided with a plurality of power sources.

In the present braking system, the main control device 100 is operated when at least one of the four service brakes 140–146 is found defective, to determine whether the operation of each of the normal service brakes and the parking brakes 145–156 should be permitted or inhibited. This determination is effected according to a control data map indicated in FIG. 8 and a brake control routine illustrated in the flow chart of FIG. 9. The control data map and the brake control routine are stored in the ROM 104. The brake control routine of FIG. 9 is initiated with step S51 to determine whether any one of the service brakes 140–146 is defective. If at least one of the service brakes 140–146 is defective, an affirmative decision (YES) is obtained in step S51, and the control flow goes to step S52 to determine whether the wheel whose service brake is defective is provided with a parking brake. In the present embodiment, all of the wheels 20–26 are provided with both the service brake 140–146 and the parking brake 150–156, an affirmative decision (YES) is obtained in step S52, and the control flow goes to step S53 to determine whether the operation of each normal one of the services brake 140–146 and the parking brakes 15–156 should be permitted or inhibited, according to the control data map illustrated in the table of FIG. 8.

The control data map of FIG. 8 is formulated such that the parking brake corresponding to the defective service brake is operated in principle. In some cases, however, the parking brake corresponding to the defective service brake is not operated, or the parking brake corresponding to a selected one of the normal service brakes is operated. In some other cases, the operation of a selected one of the normal service brakes is inhibited or restricted.

The braking force to be generated by each parking brake is smaller than that to be generated by each service brake. Therefore, where the mere operation of the parking brake corresponding to the defective service brake may cause a relatively large difference between the total left braking force and the total right braking force of the vehicle. To avoid this where the front and rear parking brakes on one of the left and right sides of the vehicle are operated, for example, the operation of the rear service brake on the other side is either inhibited (P+P: S) or restricted (P+P: S+S'). Where the front service brake and the rear parking brake (or the front parking brake and the rear service brake) on one side of the vehicle are operated, a similar control is effected, that is, the operation of the rear service brake on the other side of the vehicle is either inhibited (P+S: S) or restricted (P+S: S+S').

There will be described various cases in detail.

Where only one of the rear service brakes 144, 146 is defective, the parking brake 154, 156 corresponding to this defective rear service brake 144, 146 is not operated. In this respect, it is noted that the vehicle running stability will not be significantly deteriorated even if one of the service brakes 144, 146 for the rear wheels 24, 26 is not operated, as described above with respect to the first embodiment. The inhibition of the unnecessary operation of the parking brake 154, 156 corresponding to the defective rear service brake 144, 146 reduces the total amount of electric energy required for the braking system.

Where one of the front wheel service brakes 140, 142 which is located on one of the left and right sides of the vehicle is defective, the parking brake 150, 152 corresponding to the defective service brake 140, 142 is operated, and the operation of one of the rear service brakes 144, 146 which is located other side of the vehicle is inhibited (P+S: S) or restricted (P+S: S+S'). Since the braking force generated by the parking brake is smaller than that generated by the service brake, it is necessary to inhibit or restrict the operation of the rear service brake on the other side, for reducing the difference between the total left braking force and the total right braking force. Where the service brake 140 for the front left wheel 20 is defective, for instance, the front left parking brake 150 is operated, and the operation of the service brake 146 for the rear right. wheel 26 is inhibited or restricted.

Then, the cases where two of the service brakes 140–146 are defective will be described. Where the service brakes 140, 142 for the front left and right wheels 20, 22 are defective, the corresponding front parking brakes 150, 152 are operated. In this case, all of the four wheels 20–24 are braked, so as to reduce the reduction of the total braking force applied to the vehicle.

Where one of the front service brakes 140, 142 which is located on one side of the vehicle is defective while one of the rear service brakes 144, 146 which is located on the other side of the vehicle is defective, the parking brake 150, 152 corresponding to the defective front service brake 140, 142 is operated, but the parking brake 154, 156 corresponding to the defective rear service brake 144, 146 is not operated (S+P: S). In this case, the rear wheel 24, 26 corresponding to the defective rear service brake 144, 146 is not braked. Where the service brake 140 for the front left wheel 20 and the service brake 146 for the rear right wheel 26 are defective, the parking brake 150 for the front left wheel 20 is operated, but the parking brake 156 for the rear right wheel 26 is not operated. The vehicle running stability can be maintained at a satisfactory level even when one of the rear wheels 24, 26 is not braked.

Where the service brakes 144, 146 for the rear left and right wheels 24, 26 are both defective, the corresponding parking brakes 154, 156 are both operated.

Where the two service brakes on one of the left and right sides of the vehicle are defective, the parking brakes corresponding to the defective service brakes are operated, and the operation of the normal rear service brake is inhibited (P+P: S) or restricted (P+P: S+S'). Where the service brakes 140, 144 for the front and rear left wheels 20, 24 are defective, for example, the corresponding parking brakes 150, 154 are operated, and the operation of the normal service brake 146 for the normal rear right wheel 26 is inhibited or restricted.

There will next be described the cases where three of the four service brakes 140–146 are defective. Where the three defective service brakes include only one of the front wheel service brakes 140, 142, the parking brake 150, 152 corresponding to the defective front wheel service brake 140, 142 is operated, and only one of the parking brakes 154, 156 which corresponds to one of the defective rear service brakes 144, 146 which is located on the same side of the vehicle as the defective front service brake is operated (P+P: S). Where the service brakes 140, 144, 146 for the front left and rear left and right wheels 20, 24, 26 are defective, the parking brake 150, 154 for the front and rear left wheels 20, 24 are operated, but the parking brake 156 for the rear right wheel 26 is not operated.

Where the three defective service brakes include the two defective front wheel service brakes 140, 142, the parking brakes 150–156 for all of the four wheels 20–26 are operated, and the operation of the normal rear wheel service brake 144, 146 is inhibited. This control arrangement to operate the parking brakes 150–156 for all of the four wheels 20–26 is more effective to reduce the reduction of the vehicle running stability, than the control arrangement to operate the parking brakes 150, 152 for the front wheels 20, 24 and the normal rear service brake 144, 146.

It will be understood from the above description of the second embodiment that where at least one of the service brakes 140–146 is defective, at least one of the parking brakes 150–156 is operated, as needed to reduce the reduction of the total braking force of the vehicle, and that the operation of at least one of the normal service brakes 140–146 is inhibited or restricted as well as at least one of the parking brakes 150–156 is operated as needed, in order to reduce the difference between the total braking force generated by the brakes on the left side of the vehicle and the total braking force generated by the brakes on the right side, so that the reduction of the vehicle running stability due to the defective service brake or brakes can be reduced. Further, the two groups of service brakes 140–146 and parking brakes 150–156 are connected to the respective different power sources 200, 202, the braking system can be operated with an electric energy supplied from one of the two power sources 200, 202 when the other power source is defective with a voltage drop or other abnormality.

It will be understood that the motor controllers 170–176, 190–196 and the main control device 100 including the ROM 56 storing the control data map of FIG. 8 and the brake control program for the brake control routine of FIG. 9 cooperate with each other to constitute an emergency brake control portion operable when at least one of a plurality of primary brake devices in the form of the service brakes 140–146 is defective, for operating at least one of at least one secondary brake device in the form of at least one of the parking brakes 10–156, which at least one secondary brake device corresponds to the defective at least one primary brake device.

It will also be understood that the above-indicated emergency brake control portion includes a braking-force-difference reducing type brake control portion for controlling at least one of braking forces to be generated by the primary and second brake devices, such that a difference between a total left braking force to be generated by all of at least one of the primary and secondary brake devices that is located on one of left and right sides of the vehicle and a total right braking force to be generated by all of the: other of the primary and secondary brake devices that is located on the other side will not exceed a predetermined threshold.

The electrically operated service brakes 140–146 and the electrically operated parking brakes 150–156 are controlled otherwise, for instance, as indicated in FIGS. 10 and 11, when at least one of the service brakes 140–146 is defective.

In the third embodiment of FIGS. 10 and 11, the brake control routine illustrated in the flow chart of FIG. 11 is executed at a predetermined time interval, for each of the wheels 20–26. The routine is initiated with step S71 to determine whether a difference obtained by subtracting the actual braking force from the desired braking force is larger than a predetermined threshold, that is, whether the actual braking force is smaller than the desired value by more than a predetermined amount. If the actual braking force is smaller than the desired value by more than the predetermined amount, the service brake for the wheel in question is considered to be defective. If the actual braking force is not smaller than the desired value by more than the predetermined amount, that is, if the above-indicated difference is smaller than the predetermined threshold, a negative decision (NO) is obtained in step S71, and the following steps S72–S75 will not be implemented. If an affirmative decision (YES) is obtained in step S71, the control flow goes to step S72 to inhibit the operation of the service brake of the wheel in question, namely, the service brake which has been found defective, and to step S73 to operate the parking brake corresponding to the defective service brake.

Step S73 is followed by step S74 to determine whether the absolute value of the yaw rate of the vehicle detected by the raw rate sensor 56 is equal to or higher than a predetermined threshold. If a negative decision (NO) is obtained in step S74, one cycle of execution of the routine of FIG. 11 is terminated. If an affirmative decision (YES) is obtained, that is, the absolute value of the detected vehicle yaw rate is equal to or higher than the threshold, the control flow goes to step S75 wherein the operation of at least one of the normal service brakes is restricted according to a control data map of FIG. 10, in order to reduce a difference between the total left braking force and the total right braking force. The operation of the normal service brake is restricted to reduce the braking force to be generated, by a predetermined amount, or by an amount corresponding to the detected yaw rate of the vehicle. For instance, the commanded braking force is reduced or decremented until the absolute value of the detected yaw rate is reduced down to the predetermined threshold.

As shown in FIG. 10, the service brake whose actual braking force is smaller than the threshold and is considered defective is turned off to inhibit its operation, and the corresponding parking brake is necessarily operated. If the absolute value of the detected vehicle yaw rate is equal to or higher than the threshold, the operation of the normal rear wheel service brake or one of the two normal rear wheel service brakes is restricted to reduce the total braking force applied to the rear wheels. If the service brakes for the two rear wheels are defective, the operation of the normal front wheel service brake or one of the two normal front wheel service brakes is restricted to reduce the total braking force applied to the front wheels.

Where only one of the service brakes 144, 146 for the rear wheels 24, 26 is defective, the parking brake 154, 156 corresponding to the defective service brake 144, 146 is operated, contrary to the control arrangement according to the control data map of FIG. 8 in which the rear wheel parking brakes are not operated when the rear wheel service brakes are defective. Further, if the absolute value of the detected vehicle yaw rate is equal to or higher than the threshold, the operation of the normal rear wheel service brake 154, 156 is restricted to reduce the difference of the total left and right braking forces.

When only one of the service brakes 140, 142 for the front wheels 20, 22, the corresponding front wheel parking brake 150, 152 is operated as in the second embodiment of FIG. 8. In the present third embodiment, the operations of the normal rear wheel service brakes 144, 146 are not completely inhibited, but may be suitably restricted. However, this restriction may include temporary zeroing of the braking forces to be generated by the normal rear wheel service brakes.

There will be described the cases where two of the service brakes 140–146 are defective. Where the front left and right wheel service brakes 140, 142 or the rear left and right wheel service brakes 144, 146 are defective, the corresponding parking brakes 150, 152, or 154, 156 are operated, as in the second embodiment of FIG. 8.

Where one of the front wheel service brakes 140, 142 and one of the rear wheel service brakes 144, 146 are defective, the corresponding two parking brakes are operated. Further, if the absolute value of the detected vehicle yaw rate is equal to or higher than the predetermined threshold, the operation of the normal rear wheel service brake 144, 146 is restricted (P+P: P+S'), to reduce the total rear braking force.

Where the front and rear left wheel service brakes 140, 144 or the front and rear right wheel service brakes 142, 146 are defective, the corresponding two parking brakes 152, 156, or 150, 154 are operated. Further, if the absolute value of the detected vehicle yaw rate is equal to or higher than the threshold, the operation of the normal rear wheel service brake is restricted )P+P: S+S'), to reduce the total braking force to be generated by the normal front and rear service brakes.

Where three of the service brakes 140–146 are defective, the corresponding three parking brakes are operated. If the absolute value of the detected vehicle yaw rate is equal to or higher than the threshold, the operation of the normal service brake is restricted (P+P; S'+P)(P+P: P+S').

It will be understood from the above description of the third embodiment that all of the at least one parking brake corresponding to at least one defective service brake is operated, so as to reduce the reduction of the total braking force of the vehicle when the at least one service brake is defective. Further, the operation of at least one of the normal service brakes is restricted so as to prevent an excessively large difference between the total left braking force and the total right braking force, for thereby reducing the reduction of the vehicle running stability.

Further, since the operation the normal service brake or brakes is not necessarily restricted but is restricted only when the absolute value of the detected vehicle yaw rate is equal to or higher than the predetermined threshold value, the reduction of the total braking force of the vehicle is minimized. In addition, the diagnosis of each service brake includes not only a diagnosis to detect a defect of the electric motor, but also a diagnosis to determine whether the actual braking force is smaller than the desired value by more than a predetermined amount. This arrangement prevents an insufficient total braking force of the vehicle due to a defect of the disc brake mechanism of the service brake or brakes.

In the third embodiment, the operation of the normal service brake or brakes is restricted or not depending upon the detected yaw rate of the vehicle. However, the restriction of the operation of the normal service brake may be effected depending upon the detected steering angle of the steering wheel or the front wheels 20, 22, or depending upon whether the detected vehicle speed V is higher than a threshold determined by the steering state of the vehicle, as in the first embodiment.

While the third embodiment is arranged to inhibit the operation of each defective service brake, this arrangement is not essential, and the defective service brake may be operated even after a defect thereof is found. In this case, the defective service brake and the corresponding parking brake are both operated for the corresponding wheel.

In the second and third embodiments, the service brakes 140–146 which are disc brakes are used as the primary brake devices, and the parking brakes 150–156 which are drum brakes are used as the secondary brake devices. However, the parking brakes may be regenerative brakes. Further, it is possible to use regenerative brakes as the primary brake devices, and disc brakes as the secondary brake devices.

It is to be understood that the present invention may be embodied with various other changes, modifications and improvements, such as those described in the SUMMARY OF THE INVENTION, which may occur to those skilled in the art, without departing from the spirit and scope of the invention defined in the following claims.

What is claimed is:

1. A brake control apparatus for controlling at least three brake devices provided for braking respective at least three wheels of an automotive vehicle which includes two wheels located on respective left and right sides of the vehicle, said brake control apparatus comprising:

an emergency brake control portion for controlling at least two normal brake devices of said at least three brake devices when at least one of said at least three brake devices is defective, said emergency brake control portion including a running condition detecting portion for detecting a running condition of a vehicle and determining whether there is a likelihood of deterioration of a running stability of the vehicle when all of said at least two normal brake devices are operated in the detected running condition of the vehicle, said emergency brake control portion controlling said at least two normal brake devices such that a difference between a total left-side braking force to be generated by at least one of said at least two normal brake devices which is located on the left side of the vehicle and a total right-side braking force to be generated by the other of said at least two normal brake devices which is located on the right side of the vehicle is made larger when said running condition detecting portion does not determine that there is said likelihood of deterioration, than when said running condition detecting portion determines that there is said likelihood of deterioration.

2. A brake control apparatus according to claim 1, wherein said running condition detecting portion determines whether there is said likelihood of deterioration of said running stability of the vehicle, on the basis of at least one of a detected running speed and a detected steering state of the vehicle.

3. A brake control apparatus according to claim 2, wherein said running-condition detecting portion determines that the operations of all of said at least two normal brake devices in said detected running condition of the vehicle are not likely to deteriorate the running stability of the vehicle, when said detected running speed is lower than a predetermined threshold determined by said detected steering state of the vehicle.

4. A brake control apparatus according to claim 1, wherein said emergency brake control portion includes a turning-direction-based running-condition detecting portion for detecting a determination as to whether the operations of all of said at least two normal brake devices in said detected running condition of the vehicle are likely to deteriorate the running stability of the vehicle, on the basis of a location of each of said at least one defective brake device on the vehicle and a detected direction of turning of the vehicle.

5. A brake control apparatus according to claim 4, wherein said turning-direction-based running-condition detecting portion determines that the operations of all of said at least two normal brake devices in said detected running condition are not likely to deteriorate the running stability of the vehicle when said at least one defective brake device includes a brake device provided for one of said at least three wheels which is located on an inner side of a path of turning of the vehicle in said detected direction.

6. A brake control apparatus according to claim 1, wherein said emergency brake control portion determines that the vehicle has a higher degree of running stability when the number of said at least one defective brake device is relatively small than when said number is relatively large.

7. A brake control apparatus according to claim 1, wherein said emergency brake control portion controls a braking force to be generated by each of at least one of said at least two normal brake devices, on the basis of said detected running condition of the vehicle.

8. A brake control apparatus according to claim 1, wherein said emergency brake control portion includes a change-rate restricting portion for controlling at least one of a rate of increase and a rate of reduction of a braking force to be generated by each of at least one of said at least two normal brake devices, such that each of said at least one of said rates of increase and reduction is lower when at least one of said at least three brake devices is found defective than when none of said at least three brake devices is found defective.

9. A brake control apparatus according to claim 1, wherein said emergency brake control portion includes a change-rate restricting portion for controlling at least one of a rate of increase and a rate of reduction of a braking force to be generated by each of at least one of said at least two normal brake devices, such that each of said at least one of said rates of increase and reduction is lower when normal operations of all of said at least two normal brake devices in said detecting running condition of the vehicle are likely to increase said difference between said total left-side braking force and said total right-side braking force, than when said normal operations are not like to increase said difference.

10. A brake control apparatus for controlling a plurality of brake devices for braking respective wheels of an automotive vehicle, said brake control apparatus comprising:

a change-rate restricting portion is provided for restricting at least one of a rate of increase and rate of reduction of a barking force to be generated by each of at least one of at least one normal brake device of said plurality of brake devices, when at least one of said plurality of brake devices is found defective, such that each of said at least one of said rates of increase and reduction is lower when said at least one of said at least three brake devices is found defective than when none of said plurality of brake devices is found defective.

11. A brake control apparatus according to claim 1, wherein each of said brake devices includes a friction member movably supported by a body of said automotive vehicle, and an electrically operated actuator operable to force said friction member against a rotor rotating with a corresponding one of said wheels, said electrically operated actuator being operated with an electric energy to be supplied thereto such that a force by which said friction member is forced against said rotor by said actuator is controllable by controlling an amount of said electric energy.

12. A brake control apparatus according to claim 10, wherein each of said brake devices includes a friction member movably supported by a body of said automotive vehicle, and an electrically operated actuator operable to force said friction member against a rotor rotating with a corresponding one of said wheels, said electrically operated actuator being operated with an electric energy to be supplied thereto such that a force by which said friction member is forced against said rotor by said actuator is controllable by controlling an amount of said electric energy.

13. A brake control apparatus for controlling a plurality of brake devices for braking respective wheels of an automotive vehicle, said brake control apparatus comprising:

an emergency brake control portion is provided for controlling at least one normal brake device of said plurality of brake devices when at least one of said plurality of brake device is defective, such that a braking force to be generated by each of at least one of said at least one normal brake device is controlled on the basis of a detected running speed of the vehicle.

14. A brake control apparatus according to claim 13, wherein said emergency brake control portion operates all of said at least one normal brake device when said detected running speed of the vehicle is lower than a predetermined threshold, and inhibits an operation of at least one of said at least one normal brake device when said detected running speed is not lower than said predetermined threshold.

15. A brake control apparatus according to claim 12, wherein said emergency brake control portion includes a first braking-force restricting portion for controlling a braking force to be generated by each of said at least one of said at least one normal brake device such that said braking force is smaller when said detected running speed of the vehicle is higher than a predetermined threshold than when the detected running speed is not higher than said predetermined threshold.

16. A brake control apparatus according to claim 14, wherein said emergency brake control portion includes a second braking-force restricting portion for determining said threshold value such that said threshold value is smaller when the number of said at least one defective brake device is relatively large than when said number is relatively small.

17. A brake control apparatus according to claim 15, wherein said emergency brake control portion includes a second braking-force restricting portion for determining said threshold value such that said threshold value is smaller when the number of said at least one defective brake device is relatively large than when said number is relatively small.

18. A brake control apparatus for controlling a plurality of brake devices for braking respective wheels of an automotive vehicle, comprising;

an emergency brake control portion is provided for controlling at least one normal brake device of said plurality of brake devices when at least one of said plurality of brake devices is defective, such that a braking force to be generated by each of at least one of said at least one normal brake device is controlled on the basis of a detected steering state of the vehicle.

19. A brake control apparatus according to claim 18, wherein said emergency brake control portion includes a third braking-force restricting portion for controlling at least one of said at least one normal brake device which is located on one of opposite sides of the vehicle which is opposite to the other side on which one of said at least one defective brake device is located, such that a braking force to be generated by each of said at least one of said at least one normal brake device located on said one of opposite sides of the vehicle is made smaller when said one of said at least one defective brake device which is located on said other side of the vehicle is located on an outer side of a path of turning of the vehicle than when said one of said at least one defective vehicle is located on an inner side of said path of turning of the vehicle.

20. A brake control apparatus according to claim 19, wherein said third braking-force restricting portion controls said braking force to be generated by said each of said at least one of said at least one normal brake device such that the braking force is smaller when a detected steering angle of the vehicle is relatively large than when said detected steering angle is relatively small.

21. A brake control apparatus according to claim 18, wherein said emergency brake control portion further includes a running-speed-based brake control portion for controlling the braking force to be generated by said each of at least one of said at least one normal brake device, on the basis of a detected running speed of the vehicle.

* * * * *